US008909627B1

(12) United States Patent
Popovici et al.

(10) Patent No.: US 8,909,627 B1
(45) Date of Patent: Dec. 9, 2014

(54) FAKE SKIP EVALUATION OF SYNONYM RULES

(71) Applicant: Google Inc., Mountain View, CA (US)

(72) Inventors: Dan Popovici, Cupertino, CA (US); Terry Yang-Hoe Koo, San Francisco, CA (US)

(73) Assignee: Google Inc., Mountain View, CA (US)

( * ) Notice: Subject to any disclaimer, the term of this patent is extended or adjusted under 35 U.S.C. 154(b) by 71 days.

(21) Appl. No.: 13/661,734

(22) Filed: Oct. 26, 2012

Related U.S. Application Data

(60) Provisional application No. 61/565,283, filed on Nov. 30, 2011.

(51) Int. Cl.
*G06F 17/30* (2006.01)

(52) U.S. Cl.
USPC .......................................................... 707/723

(58) Field of Classification Search
CPC ................................................ G06F 17/30132
USPC ................................................. 707/769, 723
See application file for complete search history.

(56) References Cited

U.S. PATENT DOCUMENTS

| | | | |
|---|---|---|---|
| 4,164,025 A | 8/1979 | Dubnowski et al. | |
| 4,823,306 A | 4/1989 | Barbic et al. | |
| 5,724,571 A | 3/1998 | Woods | |
| 5,826,261 A | 10/1998 | Spencer | |
| 5,926,812 A | 7/1999 | Hilsenrath et al. | |
| 5,960,383 A | 9/1999 | Fleischer | |
| 5,987,457 A | 11/1999 | Ballard | |
| 6,006,222 A | 12/1999 | Culliss | |
| 6,012,053 A | 1/2000 | Pant et al. | |
| 6,014,665 A | 1/2000 | Culliss | |
| 6,029,195 A | 2/2000 | Herz | |
| 6,035,294 A | 3/2000 | Fish | |
| 6,078,916 A | 6/2000 | Culliss | |

(Continued)

FOREIGN PATENT DOCUMENTS

| | | |
|---|---|---|
| EP | 1505520 | 5/2006 |
| WO | WO2006096842 | 9/2006 |

OTHER PUBLICATIONS

"The Direct Hit Popularity Engine Technology, A White Paper," [online]; Retrieved from the Internet URL: http://www.uni-koblenz.de/FB4/Institutes/ICV/AGKrause/Teachings/SS07/DirectHit.pdf, Apr. 2, 2009, 5 pages.

(Continued)

*Primary Examiner* — Etienne Leroux
(74) *Attorney, Agent, or Firm* — Fish & Richardson P.C.

(57) ABSTRACT

Methods, systems, and apparatus, including computer programs are encoded on a computer storage medium, for fake skip evaluation of synonyms. In one aspect, a method includes determining, using query log data, that a particular search result selected by a user includes a query term included in an initial search query and a particular synonym that was generated for the query term using a particular synonym rule. The particular search result is selected by the user from among search results that were generated using an initial search query and one or more revised search queries that include the particular synonym. The method further includes determining, using the query log data, that a first search result is ranked above the particular search result, and includes the particular synonym for the query term. In response to these determinations, a fake skip count is incremented for the synonym rule that corresponds to the particular synonym.

24 Claims, 17 Drawing Sheets

(56) References Cited

U.S. PATENT DOCUMENTS

| | | |
|---|---|---|
| 6,169,986 B1 | 1/2001 | Bowman et al. |
| 6,182,067 B1 | 1/2001 | Presnell et al. |
| 6,272,507 B1 | 8/2001 | Pirolli et al. |
| 6,285,999 B1 | 9/2001 | Page |
| 6,289,353 B1 | 9/2001 | Hazlehurst et al. |
| 6,311,214 B1 | 10/2001 | Rhoads |
| 6,314,419 B1 | 11/2001 | Faisal |
| 6,360,215 B1 | 3/2002 | Judd et al. |
| 6,405,175 B1 | 6/2002 | Ng |
| 6,421,675 B1 | 7/2002 | Ryan et al. |
| 6,473,752 B1 | 10/2002 | Fleming |
| 6,480,837 B1 | 11/2002 | Dutta |
| 6,513,036 B2 | 1/2003 | Fruensgaard et al. |
| 6,636,848 B1 | 10/2003 | Aridor et al. |
| 6,732,088 B1 | 5/2004 | Glance |
| 6,772,150 B1 | 8/2004 | Whitman et al. |
| 7,062,561 B1 | 6/2006 | Reisman |
| 7,085,820 B1 | 8/2006 | Nickerson et al. |
| 7,409,383 B1 | 8/2008 | Tong et al. |
| 7,480,652 B2 | 1/2009 | Wen et al. |
| 7,562,069 B1 | 7/2009 | Chowdhury et al. |
| 7,617,200 B2 | 11/2009 | Budzik et al. |
| 7,620,628 B2 | 11/2009 | Kapur et al. |
| 7,636,714 B1 | 12/2009 | Lamping et al. |
| 7,716,216 B1 | 5/2010 | Harik et al. |
| 7,860,870 B2 | 12/2010 | Sadagopan et al. |
| 7,925,498 B1 | 4/2011 | Baker et al. |
| 7,966,341 B2 | 6/2011 | Maghoul et al. |
| 8,001,118 B2 | 8/2011 | Dean et al. |
| 8,037,086 B1 | 10/2011 | Upstill et al. |
| 8,041,730 B1 * | 10/2011 | Upstill et al. ............ 707/769 |
| 8,065,316 B1 | 11/2011 | Baker et al. |
| 8,103,669 B2 | 1/2012 | Castellani et al. |
| 8,250,066 B2 | 8/2012 | Miedema |
| 8,316,007 B2 | 11/2012 | Liao |
| 8,321,201 B1 | 11/2012 | Baker et al. |
| 8,346,757 B1 | 1/2013 | Lamping et al. |
| 8,429,184 B2 | 4/2013 | Ismalon |
| 8,463,782 B1 | 6/2013 | Upstill et al. |
| 8,498,974 B1 | 7/2013 | Kim et al. |
| 8,600,973 B1 | 12/2013 | Popovici et al. |
| 8,620,915 B1 | 12/2013 | Brukman et al. |
| 8,645,390 B1 | 2/2014 | Oztekin et al. |
| 8,762,363 B1 | 6/2014 | Koo et al. |
| 2002/0032735 A1 | 3/2002 | Burnstein et al. |
| 2002/0078045 A1 | 6/2002 | Dutta |
| 2002/0103798 A1 | 8/2002 | Abrol et al. |
| 2002/0133483 A1 | 9/2002 | Klenk et al. |
| 2002/0156816 A1 | 10/2002 | Kantrowitz et al. |
| 2003/0123443 A1 | 7/2003 | Anwar |
| 2003/0167266 A1 | 9/2003 | Saldanha et al. |
| 2005/0076003 A1 | 4/2005 | DuBose et al. |
| 2005/0125392 A1 | 6/2005 | Curtis et al. |
| 2006/0167842 A1 | 7/2006 | Watson |
| 2007/0011154 A1 | 1/2007 | Musgrove et al. |
| 2007/0214131 A1 | 9/2007 | Cucerzan et al. |
| 2008/0091670 A1 | 4/2008 | Ismalon |
| 2008/0097891 A1 | 4/2008 | Park |
| 2008/0114721 A1 | 5/2008 | Jones et al. |
| 2008/0114751 A1 | 5/2008 | Cramer et al. |
| 2008/0140643 A1 | 6/2008 | Ismalon |
| 2008/0228754 A1 | 9/2008 | Frank et al. |
| 2008/0235187 A1 | 9/2008 | Gade et al. |
| 2008/0270138 A1 | 10/2008 | Knight et al. |
| 2009/0006359 A1 | 1/2009 | Liao |
| 2009/0043749 A1 | 2/2009 | Garg et al. |
| 2009/0063431 A1 | 3/2009 | Erol et al. |
| 2009/0106221 A1 | 4/2009 | Meyerzon et al. |
| 2009/0119261 A1 | 5/2009 | Ismalon |
| 2009/0182734 A1 | 7/2009 | Wen et al. |
| 2010/0010968 A1 | 1/2010 | Redlich et al. |
| 2010/0125575 A1 | 5/2010 | Zaragoza |
| 2010/0138402 A1 | 6/2010 | Burroughs et al. |
| 2010/0257164 A1 | 10/2010 | Halverson et al. |
| 2010/0306229 A1 | 12/2010 | Timm et al. |
| 2011/0179023 A1 | 7/2011 | Dean et al. |
| 2012/0095951 A1 | 4/2012 | Ray |
| 2012/0158685 A1 | 6/2012 | White et al. |
| 2012/0158765 A1 | 6/2012 | Kumar et al. |
| 2012/0290637 A1 | 11/2012 | Perantatos et al. |
| 2012/0303651 A1 | 11/2012 | Tao |
| 2012/0317088 A1 | 12/2012 | Pantel et al. |
| 2012/0323677 A1 | 12/2012 | Bottou et al. |
| 2013/0246383 A1 | 9/2013 | White et al. |

OTHER PUBLICATIONS

Ananthanarayanan et al., "Rule based synonyms for entity extraction from noisy text", In Proceedings of the second workshop on Analytics for noisy unstructured text data, pp. 31-38, ACM, Jul. 2008.

Efthimiadis, "Interactive Query Expansion: A User-Based Evaluation in a Relevance Feedback Environment," Journal of the American Society for Information Science, 51(11):989-1003, 2000, John Wiley & Sons, Inc.

Notice of Allowance issued in U.S. Appl. No. 13/532,326 on Feb. 25, 2014, 5 pages.

Office Action issued in U.S. Appl. No. 13/532,326 on Oct. 24, 2013, 13 pages.

Office Action issued in U.S. Appl. No. 13/481,166 on Jun. 19, 2014, 7 pages.

Office Action issued in U.S. Appl. No. 13/651,688 on Apr. 7, 2014, 32 pages.

Office Action issued in U.S. Appl. No. 13/651,688 on Jan. 17, 2014, 30 pages.

Office Action issued in U.S. Appl. No. 13/727,968 on Aug. 19, 2014, 12 pages.

Office Action issued in U.S. Appl. No. 13/443,405 on Jun. 19, 2014, 10 pages.

Office Action issued in U.S. Appl. No. 13/302,935 on Jul. 11, 2014, 16 pages.

Notice of Allowance received in U.S. Appl. No. 13/342,560 on Jul. 24, 2013, 22 pages.

Office Action issued in U.S. Appl. No. 13/342,560 on Apr. 18, 2013, 14 pages.

Office Action issued in U.S. Appl. No. 13/342,560 on Nov. 26, 2012, 15 pages.

Office Action issued in U.S. Appl. No. 13/342,604 on Dec. 20, 2012, 13 pages.

Office Action issued in U.S. Appl. No. 13/342,604 on May 13, 2013, 12 pages.

Office Action issued in U.S. Appl. No. 13/564,882 on Jul. 1, 2014, 8 pages.

Huang et al., "Analyzing and Evaluating Query Reformulation Strategies in Web Search Logs," CIKM'09, Nov. 2-6, 2009, 77-86, 10 pages.

* cited by examiner

FAKE SKIP EVALUATION OF SYNONYM RULES

CROSS-REFERENCE TO RELATED APPLICATION

This application claims the benefit of U.S. Patent Application No. 61/565,283 filed Nov. 30, 2011, the contents of which are incorporated herein by reference.

BACKGROUND

This specification generally relates to search engines, and one particular implementation relates to evaluating synonyms that are used in revising search queries.

SUMMARY

A synonym engine may evaluate a synonym rule based on determining whether a user has (i) selected a search result that includes a synonym generated using the synonym rule (referred to as "click evaluation" of the synonym rule), or (ii) selected a search result that ranks below a search result that includes a synonym generated using the synonym rule (referred to as a "skip evaluation" of the synonym rule). In either instance, the synonym engine may infer, through a user's clicking on or skipping a particular search result, that synonyms included in the particular search result played some part in the user's decision to select or not select the particular search result. This insight may be used to measure the quality of the synonym and, by extension, the quality of the corresponding synonym rule.

According to one innovative aspect of the subject matter described in this specification, such an engine may not count, or may only partially count, a user's skip of a search result that includes a particular synonym, when the particular synonym was also included in a search result that is ranked above the skipped search result. With such a skip, which is referred to by this specification as a "fake skip," a search engine may not be able to determine the extent to which the inclusion of the particular played a part in the user's decision to skip the search result.

In general, another innovative aspect of the subject matter described in this specification may be embodied in methods that include the actions of determining, using query log data, that a particular search result selected by a user includes a query term included in an initial search query, and a particular synonym that was generated for the query term using a particular synonym rule, wherein the particular search result is selected by the user from among search results that were generated using an initial search query and one or more revised search queries that include the particular synonym. A determination is made, using query log data, that a first search result is ranked above the particular search result, and includes the particular synonym for the query term. In response to determining that (i) the particular search result selected by the user includes the query term included in the initial search query, and the particular synonym that was generated for the query term using the particular synonym rule, and (ii) the first search result is ranked above the particular search result, and includes the particular synonym for the query term included in the initial search query, a fake skip count is incremented for the particular synonym rule.

These and other embodiments can each optionally include one or more of the following features. A score is assigned to the particular synonym rule based at least in part on the fake skip count. In some implementations, a score is assigned to the particular synonym rule based on the fake skip count, a click count for the synonym rule, and a skip count for the particular synonym rule. The actions further include associating a first weight with the fake skip count, a second weight with the skip count, and a third weight with the click count. The score satisfies Equation (1), below:

$$\frac{W1(\text{fake skip count}) + W2(\text{skip count})}{W1(\text{fake skip count}) + W2(\text{skip count}) + W3(\text{click count})} \quad (1)$$

In Equation (1), W1 represents a weight associated with the fake skip count for the particular synonym rule, W2 represents a weight associated with a skip count for the particular synonym rule, and W3 represents a weight associated with a click count for the particular synonym rule. The actions further include determining that the score of the particular synonym rule does not meet a threshold; and removing the particular synonym rule from a set of synonym rules used to generate revised search queries based on determining that the score does not meet the threshold. In some implementations, the search result that is ranked above the particular search result includes the query term. The actions further include determining, using the query log data, that the particular synonym for the query term was generated for the query term using a synonym rule with a particular query context, and where assigning a fake skip count to the particular synonym rule includes assigning a fake skip count to the synonym rule with the particular query context.

Particular embodiments of the subject matter described in this specification can be implemented so as to realize one or more of the following advantages. Fake skip evaluation of synonym rules can identify synonym rules that should be removed from a search system. Fake skip evaluation can also improve the quality of retrieved search results by helping to eliminate search results that users found unhelpful. Fake skip evaluation of synonyms can also demote (instead of removing completely) synonym rules, allowing low-confidence rules to be used less frequently in retrieving search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
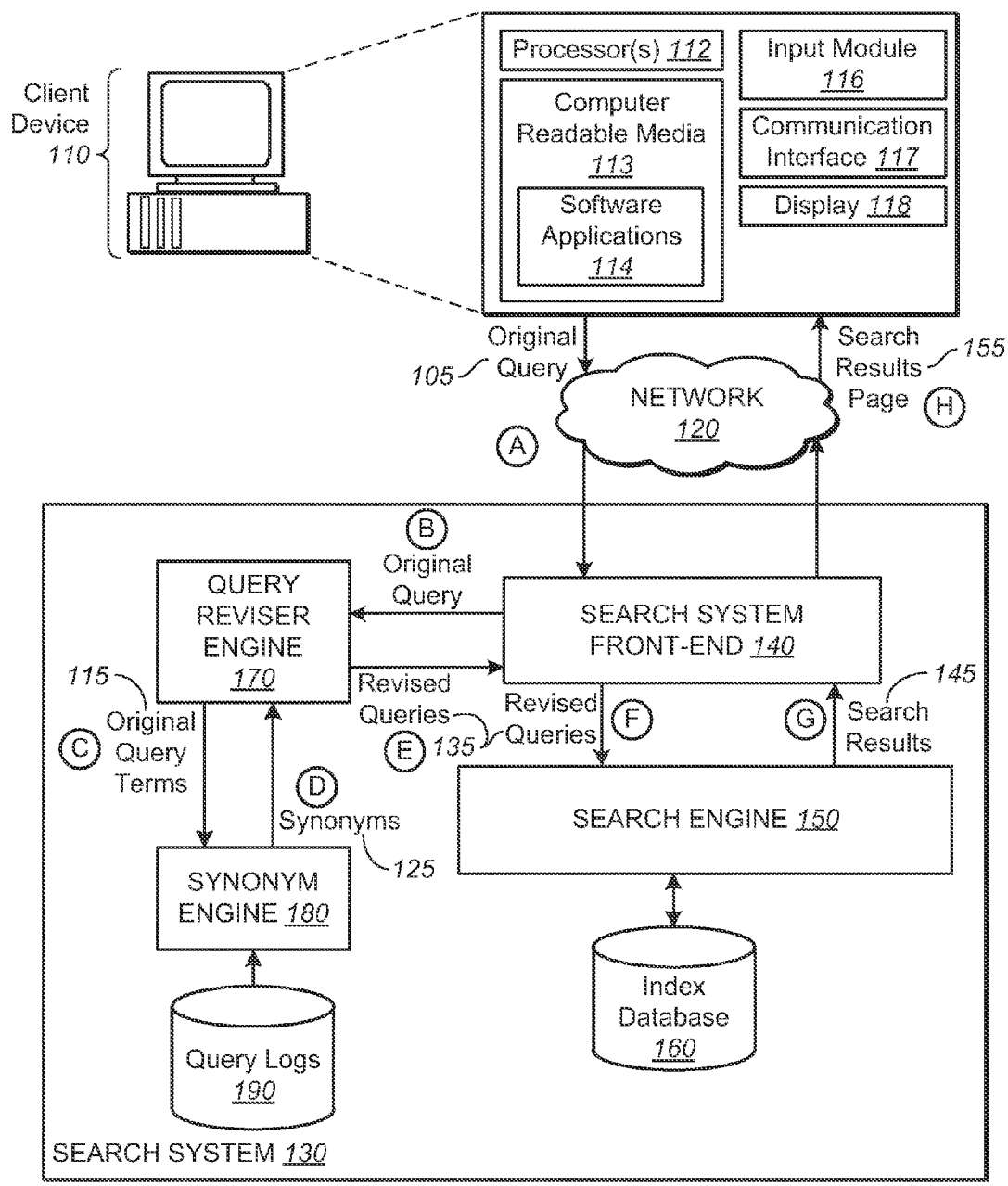
FIG. 1 is a diagram of an example system that uses synonyms to generate search results.

FIG. 1 is a diagram of an example system 100 that uses synonyms to generate search results. In general, the system 100 includes a client device 110 coupled to a search system 130 over a network 120. The search system 130 receives a query 105, referred to by this specification as the "original query" or an "initial query," from the client device 110 over network 120, and the search system 130 provides a search results page 155 that presents search results 145 identified as being responsive to the query 105 to the client device 110 over the network 120.

The search results 145 identified by the search system 130 can include one or more search results that were identified as being responsive to queries that are different than the original query 105. The other queries can be obtained or generated in numerous ways, including by revising the original query 105.

In one example, the search system 130 can generate a revised query by adding to the original query 105 additional terms that are synonyms of one or more terms that occur in the original query 105. In other implementations, the search system 130 can generate a revised query by substituting terms that are synonyms of terms that occur in the original query 105, in place of the terms in the original query 105. As used by this specification, synonyms, i.e., terms that are used to generate revised queries, are also referred to as "substitute terms." The search system can consider each of one or more terms to be synonyms or substitute terms for a particular query term. The original query 105 and the revised queries can be used by a search engine 150 to identify and rank search results. The identified search results 145 can be provided to the client device 110 on a search results page 155.

The search system 130 can identify the synonyms that are used to generate revised queries by evaluating terms included in previously received queries stored in query logs 190. For instance, given a first term ("cat"), the search system can evaluate terms ("feline" or "banana") that are candidate synonyms for the original term, and can determine that the certain terms are synonyms of the first term (as in the case of "feline"), and that other terms are not synonyms of the first term (as in the case of "banana").

The search system 130 can be implemented as, for example, computer programs running on one or more computers in one or more locations that are coupled to each other through a network. The search system 130 includes a search system front-end 140 (or a "gateway server") to coordinate requests between other parts of the search system 130 and the client device 110. The search system 130 also includes a search engine 150, a query reviser engine 170, and a synonym engine 180.

As used by this specification, an "engine" (or "software engine") refers to a software implemented input/output system that provides an output that is different than the input. An engine may be an encoded block of functionality, such as a library, a platform, Software Development Kit ("SDK"), or an object. The network 120 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, search engine 150, query reviser engine 170, and synonym engine 180 can be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g. a browser or layout engine), an input module 116 (e.g., a keyboard or mouse), communication interface 117, and a display 118. The computing device or devices that implement the search system front-end 140, the query reviser engine 170, and the search engine 150 may include similar or different components.

In general, the search system front-end 140 receives the original query 105 from client device 110, and routes the original query 105 to the appropriate engines so that the search engine results page 155 may be generated. In some implementations, routing occurs by referencing static routing tables, or routing may occur based on the current network load of an engine, so as to accomplish a load balancing function. The search system front-end 140 also provides the resulting search engine results page 155 to the client device 110. In doing so, the search system front-end 140 acts as a gateway, or interface, between the client device 110 and the search engine 150. In some implementations, the search system 130 contains many thousands of computing devices to execute for the queries that are processed by the search system 130.

Two or more of the search system front-end 140, the query reviser engine 170, and the search engine 150 may be implemented on the same computing device, or on different computing devices. Because the search engine results page 155 is generated based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted search query 105.

In FIG. 1, a user of the client device 110 enters query terms 115 for the original search query 105 during state (A), and the client device 110 communicates the original search query 105 to the search system 130 over the network 120. The user may submit the original search query 105 by initiating a search dialogue on the client device 110, by speaking or typing the terms 115 of the original search query 110, then by pressing a search initiation button or control on the client device 110. The client device 110 formulates the original search query 105, e.g., by specifying search parameters, and transmits the original search query 105 over the network 120.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 may be the second or subsequent query entered by the user, or the original query 105 may be automatically derived (e.g., by the query reviser engine 170) or may be modified based upon prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using synonyms 125 for terms in the original query 105. In other implementations, the query reviser engine 170 generates a revise query by substituting the synonyms 125 for the corresponding terms of the original query 105. The query reviser engine 170 can obtain synonyms 125 for use in revising the original query 105 from synonym engine 180.

During state (C), the query reviser engine 170 communicates terms 115 of the original query 105 to the synonym engine 180. The synonym engine 180 uses synonym rules to generate synonyms 125 for the terms 115 of the original query 105.

The search system 130 can define a synonym rule for a pair of terms that are determined to be synonyms, and can use the synonym rule at a later time to identify synonyms for query terms. For example, for a query that includes the terms "cat food," the search system 130 can identify a synonym rule that indicates that "pet" is a synonym for "cat," and can generate a revised query using "pet" as an additional or replacement term in the revised query.

Synonym rules can be defined to apply generally, or can be defined to apply only when particular conditions, or "query contexts," are satisfied. The query context of a synonym rule can specify, for example, one or more other terms that must be present in the query for the synonym rule to apply. Furthermore, query contexts can specify relative locations for the other terms (e.g. to the right or left of a query term under evaluation) or can specify a general location (e.g. anywhere in the query). For example, a particular synonym rule can specify that the term "pet" is a synonym for the query term "dog," but only when "dog" is followed by the term "food" in the query. Multiple distinct synonym rules can generate the same synonym for a given query term. For example, for the query term "dog" in the query "dog food," the term "pet" can be specified as a synonym for "dog" by both a synonym rule for "dog" in the general context and a synonym rule for "dog" when followed by "food."

The synonym rules can depend on query contexts that define other terms in the original query 105. In other words, a synonym rule need not apply in all situations. For example, when "cats" is used as a single-term query, "felines" can be considered a synonym for "cats" and returned to the query reviser engine 170 to generate a revised search query. But when the query includes "cats" followed by the term "musical," a synonym rule might specify that the term "felines" is not a synonym for "cats." The synonym rules can be stored for use by, e.g., the synonym engine 180, the query reviser engine 170, or the search engine 150.

The synonym engine 180 communicates synonyms 125 to the query reviser engine 170 during state (D). The query reviser engine 180 generates one or more revised queries 135 by, for example, adding synonyms 125 to the original query 105, or substituting certain terms of the original query 105.

The query reviser engine 170 communicates the one or more revised queries 135 to the search system front-end 140 during state (E). The search system front-end 140 communicates the original query 105 and/or the one or more revised queries 135 to the search engine 150 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. Each of the search results 145 can include, for example, titles, text snippets, images, links, reviews, or other information. The query terms 115 or the synonyms 125 that appear in the search results 145 can be formatted in a particular way, for example, in bold print. The search system front-end 140 transmits code (e.g., HyperText Markup Language code or eXtensible Markup Language code) for the search results page 155 to the client device 110 over the network 120 at state (H), so that the client device 110 can display the search results page 155.

The client device 110 invokes the transmitted code, e.g., using a layout engine, and displays the search results page 155 on the display 118. The terms 115 of the original query 105 are displayed in a query box (or "search box"), located for example, on the top of the search results page 155, and some of the search results 145 are displayed in a search results block, for example, on the left-hand side of the search results page 155.

Figure 2A:
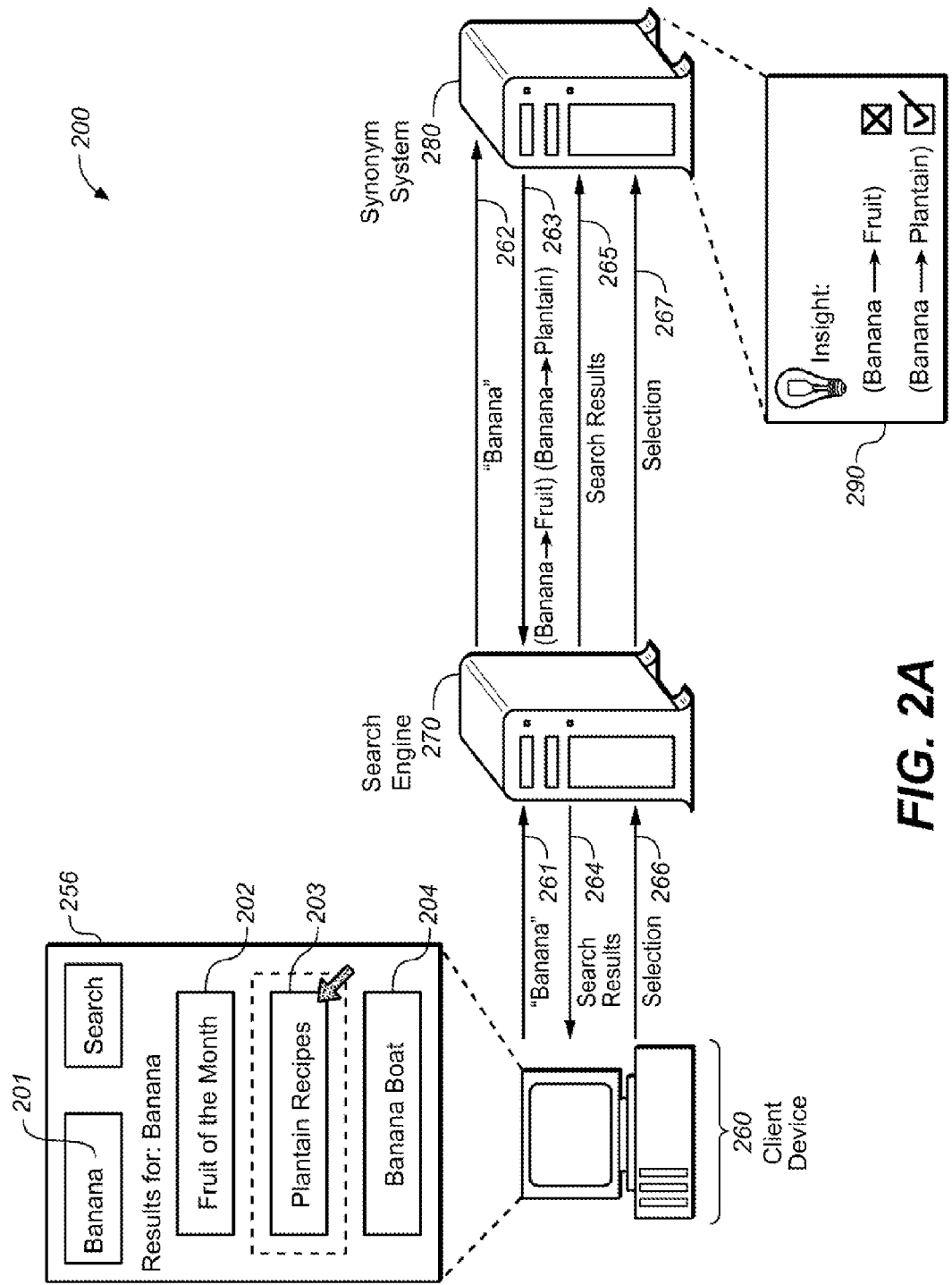
FIG. 2A is a diagram of an example system that evaluates synonym rules.

FIG. 2A is a diagram of an example system 200 that evaluates synonym rules. The system 200 includes a client device 260, a search engine system 270, and a synonym system 280. The entities illustrated in FIG. 2A can, for example, be implemented as part of the system illustrated in FIG. 1. In general, the search engine system 270 receives queries 261 from the client device 260 and provides identified search results 264 on a generated search results page 256 in response to the received queries 261. The search results page 256 can also present the entered query 201.

Some of the provided search results 264 can be identified by the search engine system 270 by revising the received query 261 to include synonyms 263 for terms of the query 261. The search engine system 270 can provide a query message 262 that includes terms of the received query 261 to the synonym system 280. The synonym system 280 can identify synonyms 263 for the terms of the received query 261 and provide the identified synonyms 263 to the search engine system 270. For example, the search engine system 270 can identify search results 202, 203, and 204 using the term "banana" from the query 261, and using the synonyms "fruit" and "plantain" of the term "banana."

As used by this specification, the synonym rule notation "A→B" indicates that, according to a particular synonym rule, the term "B" is considered to be a synonym for the term "A." Using this rule, a query reviser of the search engine system 270 may generate revised queries by adding term "B" to an original query, by substituting term "B" for term "A" in the original query, or by performing other query revision techniques.

Continuing with the above example, the synonyms "fruit" and "plantain" may be identified using two corresponding general context synonym rules, specifically the rules "banana→fruit" and "banana→plantain." Search results retrieved by the search engine system 270 can be identified by the search engine system 270 if they include the original query term "banana," or if they include any of the identified synonyms for the original query term "banana." For example, search result 202 includes a synonym, "fruit," for the original query term "banana." Similarly, search result 203 includes a synonym, "plantain," for the original query term "banana." Search result 204 includes the original query term "banana," but does not include any of the identified synonyms for the original query term "banana."

User interaction with the search results 266 can be measured in order to gain insights that the synonym system 280 may use to evaluate particular synonym rules. For example, a user selection 266 of a particular search result on search results page 256 can be received by the search engine system 270 and provided as a selection message 267 to the synonym system 280. The synonym system 280 may in turn evaluate particular synonym rules that were used to identify the synonyms associated with the particular search result, or to evaluate synonym rules that were used to identify the synonyms associated with search results that were not selected.

A particular synonym rule may be used to identify a synonym that is included in a particular revised query. If the search engine system 270 identifies a user-selected search result based on executing the particular revised query, the synonym system 280 may, through click evaluation, infer that particular synonym (and, by extension, the particular synonym rule) drove the user's decision to select the user-selected search result.

On the other hand, if the search engine system 270 identifies a particular search result based on executing the particular revised query, and if the user does not select the particular search result, the synonym system 280 may, through skip evaluation, infer that the particular synonym (and, by extension, the particular synonym rule) linked to a less relevant search result which drove the user's decision to skip the particular search result. This example is particularly relevant when the user-selected result is lower ranking than, i.e., is displayed on a search result page below, the particular search result.

For example, the query 261, which includes the term "banana," produces search results 202, 203, and 204. If users generally tend to select search results that include the term "plantain" (e.g. search result 203), the synonym system 280 can determine that using the term "plantain" in revised queries does improve the quality of the search results. By extension, the synonym system 280 can, through click evaluation, then infer that the synonym rule "banana→plantain" is a helpful synonym rule. This insight 290 may suggest that the "banana→plantain" synonym rule should have an expanded role, or should be promoted or added to the synonym system 280, in a general context or in particular contexts.

Conversely, if users tend to skip over search results that include the term "fruit" (e.g. search result 202), the synonym system 280 can determine that using the synonym "fruit" in revised queries did not improve the quality of the search results. By extension, the synonym system 280 can then infer, though skip evaluation, that the synonym rule "banana→fruit" is not a helpful synonym rule. The insight 290 gained from this situation may suggest that the "banana→fruit" synonym rule may need to be limited, demoted or removed from the synonym system 280, in a general context or in particular contexts.

To evaluate synonym rules based on user interaction with provided search results, various metrics can be computed and combined into score for each synonym rule. A separate score can be computed for each synonym rule, in a general context or in particular contexts.

One metric that can be used to evaluate synonym rules is clicks. In some implementations, a "click" occurs when a user selects a search result that was identified for a revised search query when the referenced document of the selected search result: (i) includes a synonym of a particular query term that occurs in the revised search query and (ii) does not include the particular query term. In other implementations, a "click" occurs when the search result itself, and not the referenced document, satisfies these criteria. Although the selection of a search result is referred to by this specification as a "click," the selection can also be a voice-based selection, or a selection by a user's finger on a presence-sensitive input mechanism, e.g., a touch-screen device, or any other appropriate selection mechanism.

When a referenced document of a selected search result contains both a synonym of a particular query term as well as the particular query term, it may be unclear whether the term or the synonym was responsible for selection of the search result. In these cases, the selection of the search result can be treated as a special case referred to as a "both click." In some implementations, "both clicks" are given a weight smaller than clicks due to the potential ambiguity of the user selection.

Another metric that can be used to evaluate synonym rules is skips. A skip occurs when a user skips over a particular search result that was identified for a revised search query when the referenced document of the skipped search result: (i) includes a synonym of a particular query term that occurs in the revised search query, and (ii) does not include the particular query term. Skipping over the particular search result occurs when the user selects another search result that is ranked lower than, or displayed beneath, the particular result on a search results page. In other implementations, a "skip" occurs when the search result itself, and not the referenced document, satisfies these criteria.

In cases where a skipped search result contains both a synonym of a particular query term as well as the particular query term, the skip can be treated as a special case referred to as a "both skip." In some implementations, "both skips" are given a weight smaller than skips due to the ambiguity of the user skip.

Some types of clicks and skips are particularly informative for use in evaluating synonym rules. These situations will be referred to in this specification as "crucial clicks" and "crucial skips." A crucial click or crucial skip situation occurs when a search result that is clicked or skipped is more directly associated with a single, particular synonym.

In general, a crucial click occurs when a user selects a search result that was identified for a revised search query when the referenced document of the selected search result: (i) includes a synonym of a particular query term that occurs in the revised search query, (ii) does not include the particular query term, and (iii) does not include any other synonym of the particular query term that occurs in the revised search query. In other implementations, a "crucial click" occurs when the search result itself, and not the referenced document, satisfies these criteria.

In general, a crucial skip occurs when a user selects of a search result that was below a search result that was identified for a revised search query when the referenced document of the skipped search result: (i) includes a synonym of a particular query term that occurs in the revised search query, (ii) does not include the particular query term, and (iii) does not include any other synonym of the particular query term that occurs in the revised search query. In other implementations, a "crucial click" occurs when the search result itself, and not the referenced document, satisfies these criteria.

Referring to a particular example, the search result 202 of FIG. 2A: (i) includes the synonym substitution "fruit" for the original query term "banana," (ii) does not include the query term "banana," and (iii) does not include any other synonym for "banana" that occurs in a revised search query, i.e. out of identified synonyms 263. Therefore, a user selection of search result 203, presented below search result 202, is counted as a crucial skip for the corresponding synonym rule "banana→fruit."

On the other hand, the user selection of search result 203, which (i) includes the synonym substitution "plantain" for the original query term "banana," (ii) does not include the query term "banana," and (iii) does not include any other synonym for "banana" that occurs in a revised search query, i.e. out of identified synonyms 263, can be counted as a crucial click for the relevant synonym rule "banana→plantain."

The synonym system 280 can aggregate counts of clicks, skips, crucial clicks, and crucial skips into a single score to evaluate a particular synonym rule. In some implementations, the synonym system 280 can remove a synonym rule whose corresponding score is below a threshold.

For example, the synonym system 280 can assign a respective weight (e.g. 0, 3, 5, 10, 25) to a crucial click count, a crucial skip count, a click count, a skip count, a "both click" count, and a "both skip" count. In some implementations, the weights are empirically determined. The synonym system 280 can then compute a weighted ratio using a combination of counts recorded for a particular synonym rule as shown below in Equation (2), using example weights 5, 1, and 0:

$$\text{score} = \frac{(\text{crucial\_click\_count} * 5) + (\text{click\_count} * 1) + (\text{both\_click\_count} * 0)}{\begin{bmatrix}(\text{crucial\_click\_count} * 5) + (\text{click\_count} * 1) + \\ (\text{crucial\_skip\_count} * 5) + (\text{skip\_count} * 1) + \\ (\text{both\_click\_count} * 0) + (\text{both\_skip\_count} * 0)\end{bmatrix}}. \qquad (2)$$

If the score is below a threshold (e.g. 0.6, 0.75, 0.9, 0.99), the synonym system 280 can remove or demote a particular synonym rule. After removing the synonym rule from the system, revised queries will generated by the search engine system 270 will not include synonyms identified with the particular synonym rule.

Figure 2B:
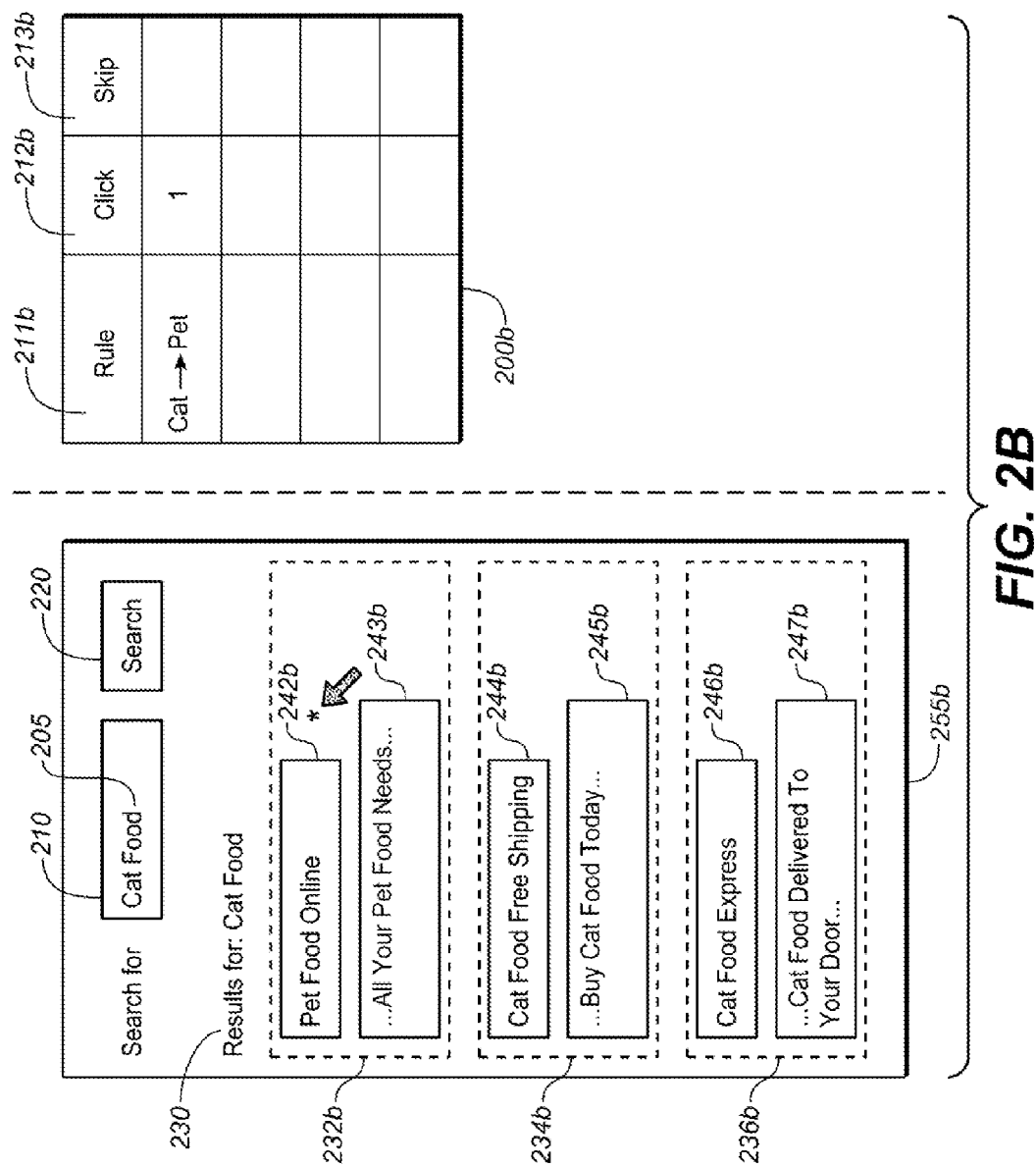
FIGS. 2B to 2C illustrate the operation of a prior art system that uses click and skip information to evaluate particular synonym rules.
Figure 2C:
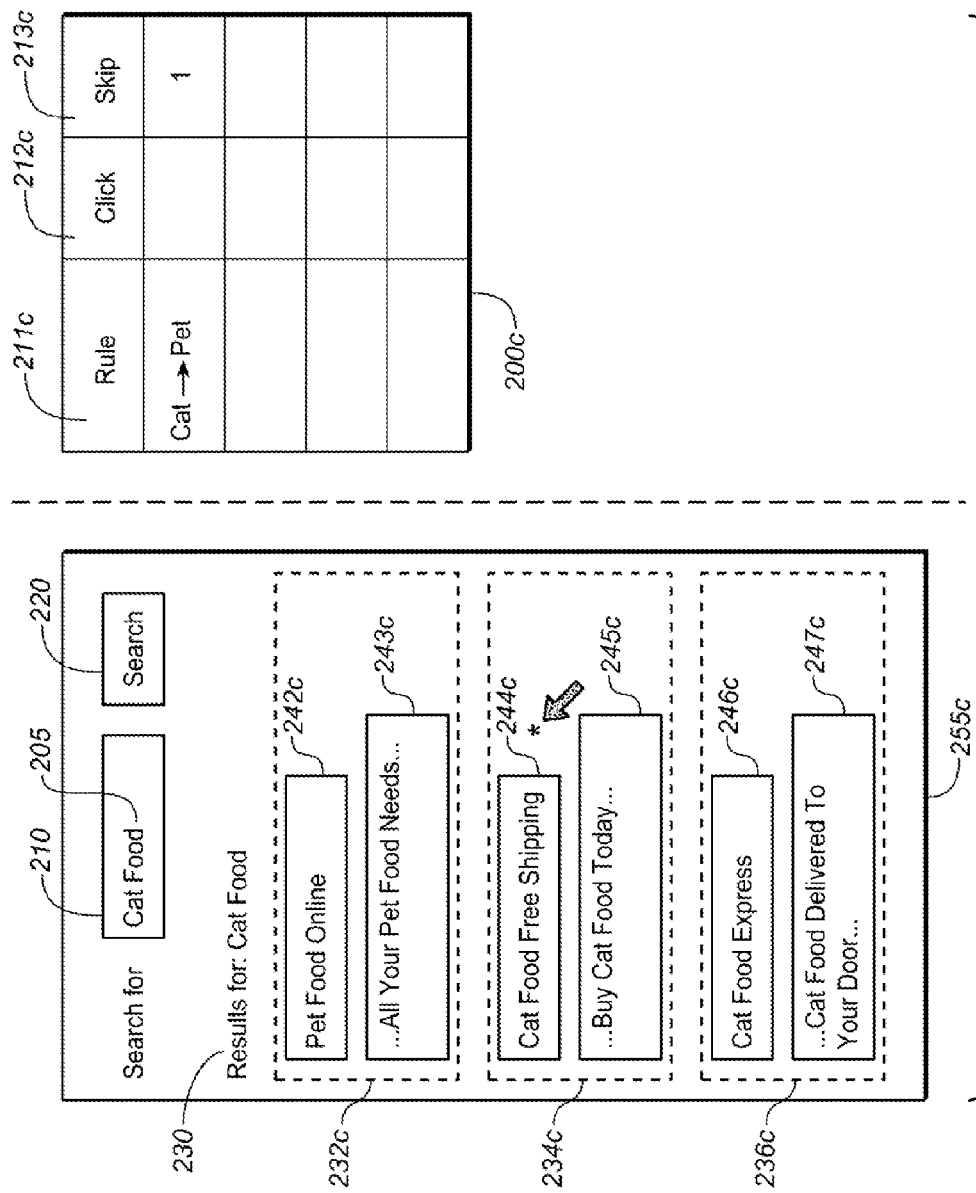

FIGS. 2B and 2C illustrate the operation of a prior art system that uses click and skip information to evaluate synonym rules. FIG. 2B illustrates an example search results page 255b and a table 200b that shows the example result of evaluating synonym rules using click and skip evaluation. The search results page 255b presents a ranked list of search results in response to a query 205 ("cat food") entered into a search box 210. The search results page can include a control element 220 (e.g. a button) for initiating a search. Each search result 232b, 234b, and 236b includes a title (e.g. "Pet Food Online" 242b) and a snippet (e.g. " . . . All your pet food needs . . . " 243b).

A user's selection of a particular search result can be evaluated using click or skip evaluation, resulting in a click or a skip being counted for particular synonym rules associated with the particular search result. The search results page 255b can be provided by a search system, for example, search system 130 as shown in FIG. 1. In addition, a search system (for example, search system 130) can receive user selections of search results on the search results page 255b and evaluate synonym rules based on the user selections.

In the example illustrated, for the two-term query "cat food," the synonym rule "cat→pet" was used to generate a three-term revised query (not shown) including the terms "cat pet food." The table 200b shows synonym substitution rules 211b that have been used to generate revised queries (not shown) used to retrieve search results 232b, 234b, and 236b. The resulting click count 212b and skip count 213b are also illustrated in table 200b. In the example shown in FIG. 2B, only the synonym rule "cat→pet" is illustrated, although synonym rules other than those shown in table 200b may also have been used to retrieve search results 232b, 234b, and 236b.

In this example, search result 232b has been selected by a user. For the particular synonym rule "cat→pet," search result 232b includes the synonym "pet." Therefore, the selection of search result 232b is counted as a "click" for the synonym rule "cat→pet" and recorded, illustrated under click count 212b in table 200b.

FIG. 2C illustrates an example search results page 255c and a table 200c that shows the example result of evaluating synonym rules using click and skip evaluation. The example search results page 255c is similar to the search results page as shown in FIG. 2B. However, in this example, the second search result (search result 234c) has been selected by the user instead of search result 232c.

For the particular synonym rule "cat→pet," selected search result 234c was presented below a search result (search result 232c) that includes the synonym "pet." Therefore, the selection of the search result 234c below search result 232c is counted as a "skip" for the synonym rule "cat→pet" and recorded, illustrated under skip count 213c in table 200c.

Figure 3A:
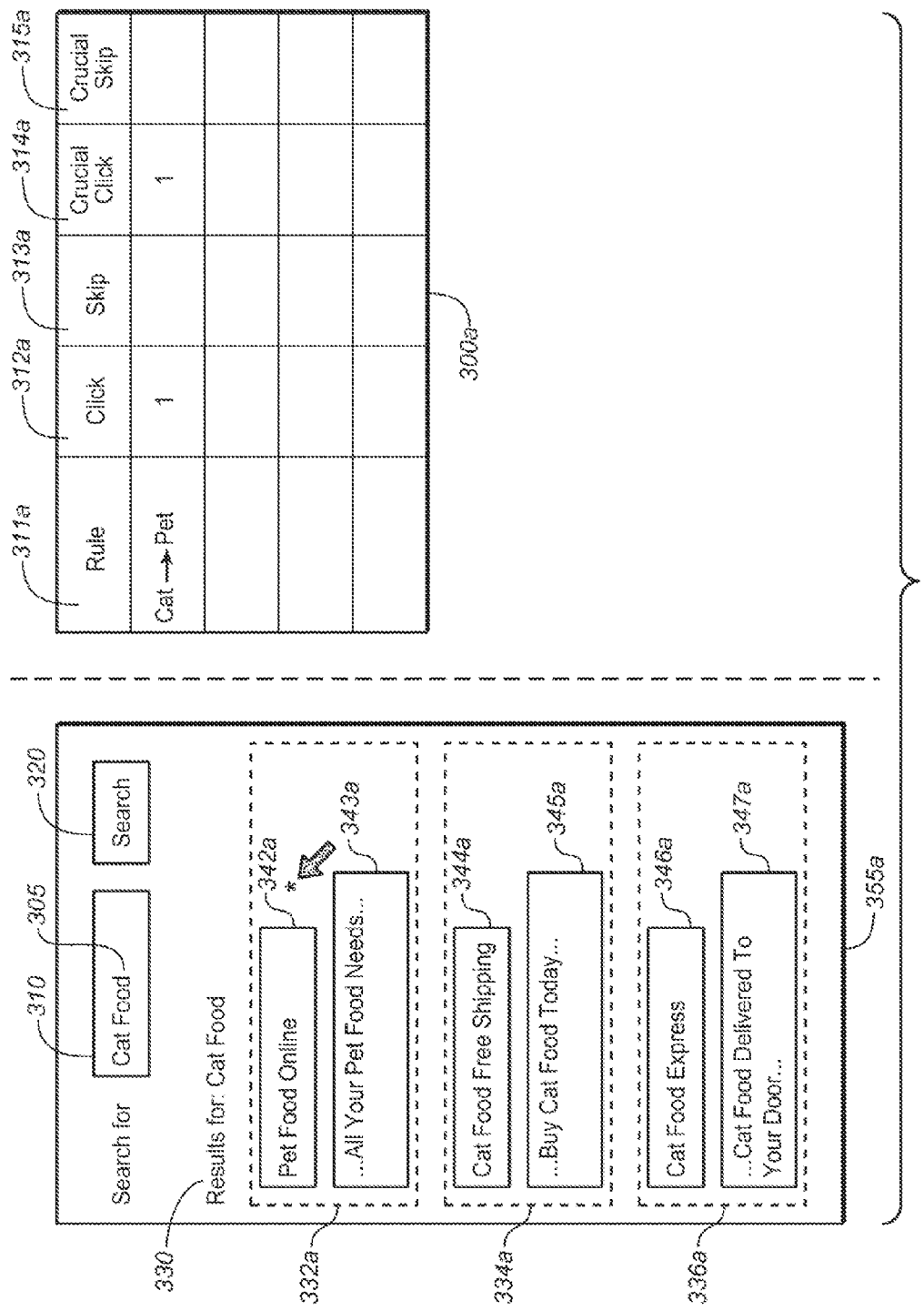
FIGS. 3A to 3H, and 6A and 6B illustrate example search results pages and tables that show the example result of evaluating synonym rules using click and skip evaluation.

FIGS. 3A-3H illustrate example search results pages and tables that show the example result of evaluating synonym rules using click and skip evaluation. FIG. 3A illustrates an example search results page 355a and a table 300a that shows the example result of evaluating synonym rules using click and skip evaluation. The search results page 355a presents a ranked list of search results in response to a query 305 ("cat food") entered into a search box 310. The search results page can include a control element 320 (e.g. a button) for initiating a search. Each search result 332a, 334a, and 336a includes a title (e.g. "Pet Food Online" 342a) and a snippet (e.g. " . . . All your pet food needs . . . " 343a).

A user's selection of a particular search result can be evaluated using click or skip evaluation, resulting in a click or a skip being counted for particular synonym rules associated with the particular search result. The search results page 355a can be provided by a search system, for example, search system 130 as shown in FIG. 1. In addition, a search system (for example, search system 130) can receive user selections of search results on the search results page 355a and evaluate synonym rules based on the user selections.

In the example illustrated, for the two-term query "cat food," the synonym rule "cat→pet" was used to generate a three-term revised query (not shown) including the terms "cat pet food." The table 300a shows synonym substitution rules 311a that have been used to generate revised queries (not shown) used to retrieve search results 332a, 334a, and 336a. The resulting click count 312a, skip count 313a, crucial click count 314a, and crucial skip count 315a are also illustrated in table 300a. In the example shown in FIG. 3A, only the synonym rule "cat→pet" is illustrated, although synonym rules other than those shown in table 300a may also have been used to retrieve search results 332a, 334a, and 336a.

In this example, search result 332a has been selected by a user. For the particular synonym rule "cat→pet," search result 332a includes the synonym "pet." Therefore, the selection of search result 332a is counted as a "click" for the synonym rule "cat→pet" and recorded, illustrated under click count 312a in table 300a.

In addition, for the particular synonym rule "cat→pet," search result 332a (i) includes a synonym in the revised search query, "pet", (ii) does not include the original query term, "cat", and (iii) does not include any other synonyms in the revised search query for the query term, "cat." Therefore, the selection of search result 332a is counted as a "crucial click" for the synonym rule "cat→pet" and recorded, illustrated under crucial click count 314a in table 300a. Intuitively, the crucial click indicates that this particular synonym rule was used to generate a revised query that caused a search result to be retrieved that was ultimately selected by a user.

Figure 3B:
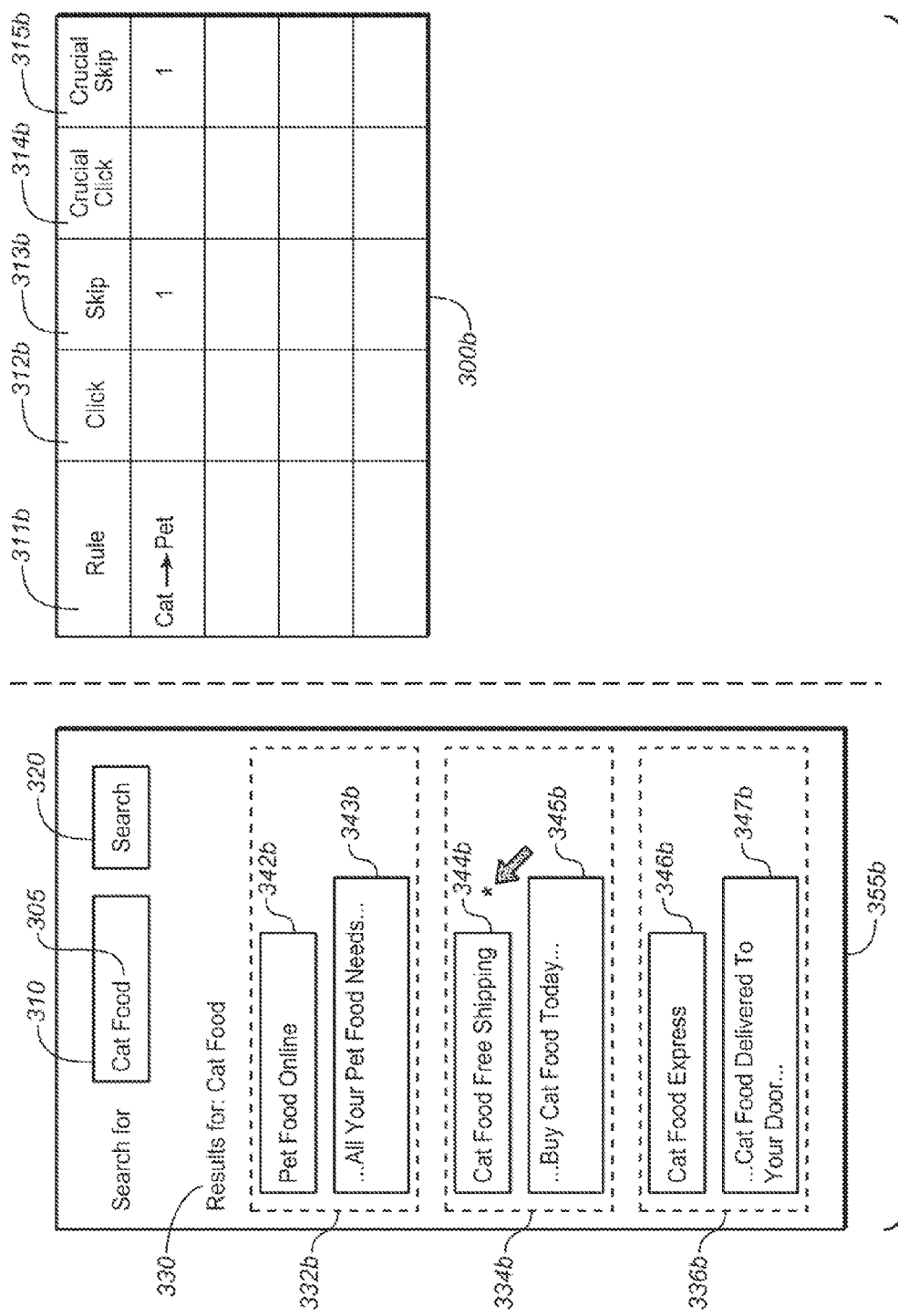

FIG. 3B illustrates an example search results page 355b and a table 300b that shows the example result of evaluating synonym rules using click and skip evaluation. The example search results page 355b is similar to the search results page generated in response to the revised query "cat pet food" as shown in FIG. 3A. However, in this example, the second search result (search result 334b) has been selected by the user instead of search result 332b.

For the particular synonym rule "cat→pet," selected search result 334b was below a search result (search result 332b) that includes a synonym in the revised search query, "pet." Therefore, the selection of the search result 334b below search result 332b is counted as a "skip" for the synonym rule "cat→pet" and recorded, illustrated under skip count 313b in table 300b.

In addition, for the particular synonym rule "cat→pet," selected search result 334b was below a search result (search result 332b) that (i) includes a synonym in the revised search query, "pet", (ii) does not include the original query term, "cat", and (iii) does not include any other synonyms in the revised search query for the query term, "cat." Therefore, the selection of search result 334b below search result 332b is counted as a "crucial skip" for the synonym rule "cat→pet" and recorded, illustrated under crucial skip count 315b in table 300b.

Figure 3C:
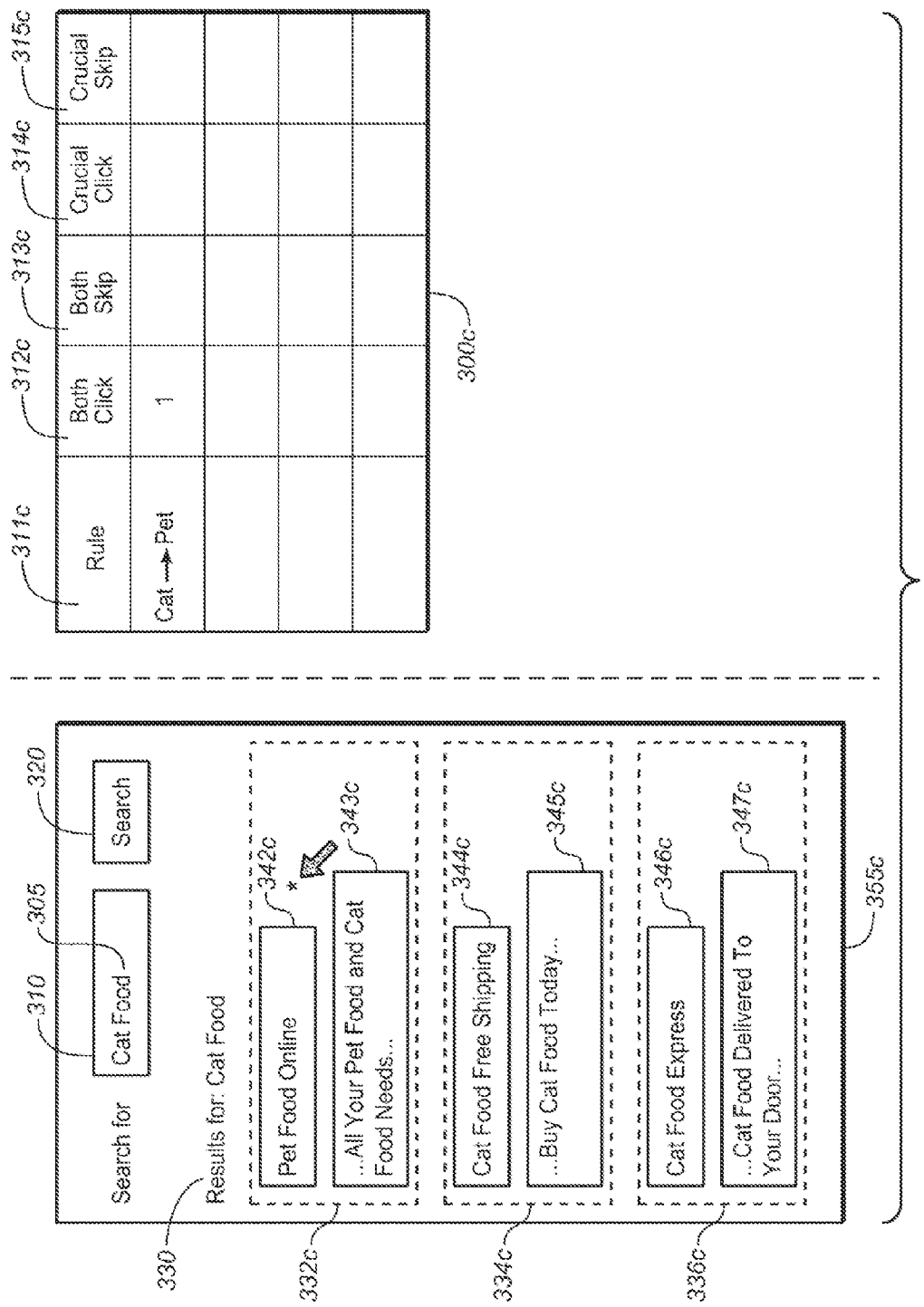

FIG. 3C illustrates an example search results page 355c and a table 300c that shows the example result of evaluating synonym rules using click and skip evaluation. In this example, search result 332c has been selected by a user. For the particular synonym rule "cat→pet," search result 332c (i) includes the synonym in the revised search query, "pet," and (ii) includes the original query term, "cat." Therefore, the selection of search result 332c is counted as a "both click" for the synonym rule "cat→pet" and recorded, illustrated under both click count 312c in table 300c.

Because search result 332c included both the synonym "pet" as well as the original query term, "cat" (in snippet 343c, " . . . All your pet food and cat food needs . . . "), the selection of search result 332c is not counted as a crucial click for the synonym rule "cat→pet."

Figure 3D:
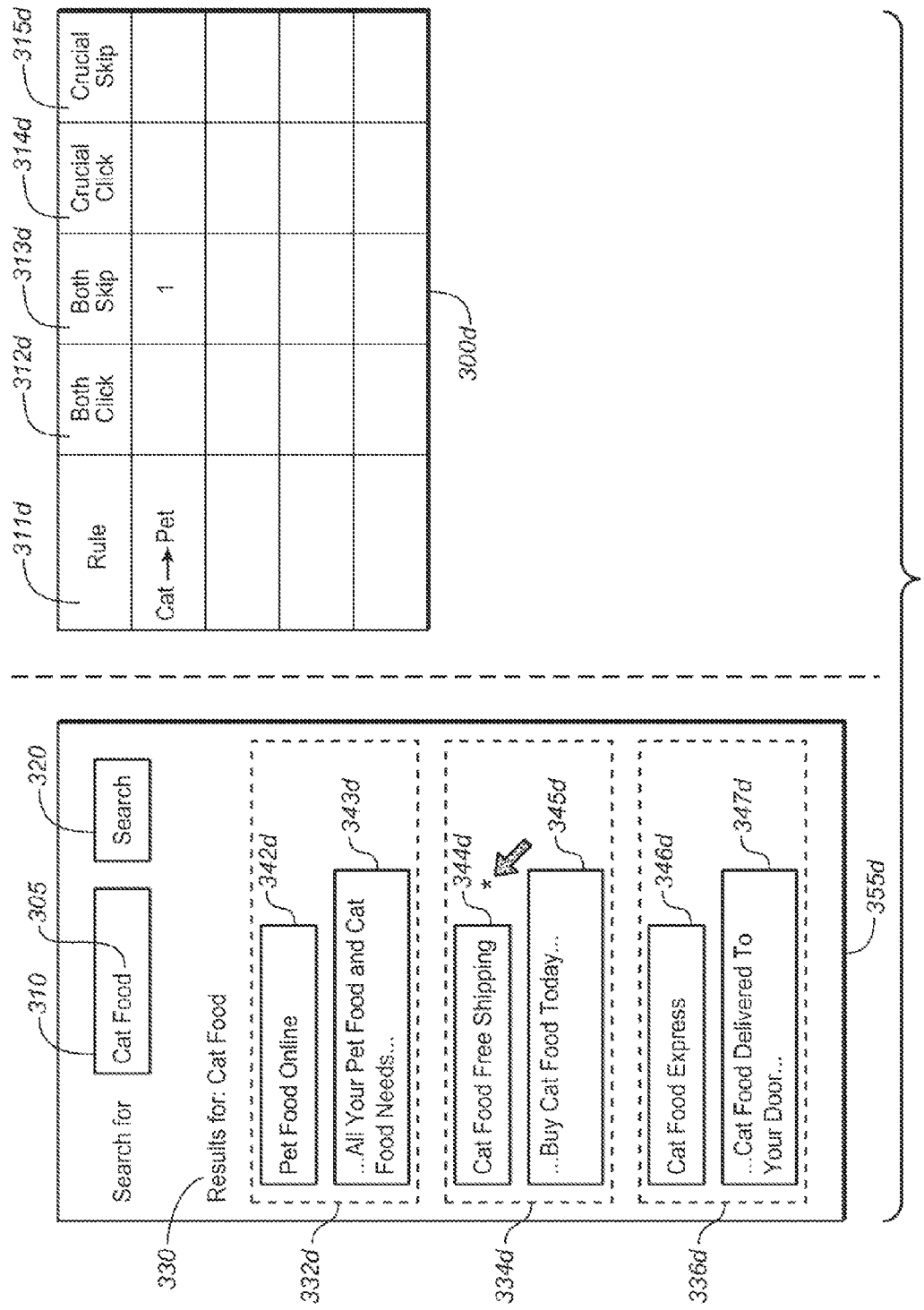

FIG. 3D illustrates an example search results page 355d and a table 300d that shows the example result of evaluating synonym rules using click and skip evaluation. The example search results page 355d is similar to the search results page generated in response to revised query "cat pet food" as shown in FIG. 3C. However, in this example, the second search result (search result 334d) has been selected by the user instead of search result 332d.

For the particular synonym rule "cat→pet," selected search result 334d was below a search result (search result 332d) that (i) includes a synonym in the revised search query, "pet," and (ii) includes the original query term, "cat." Therefore, the selection of search result 334d is counted as a "both skip" for the synonym rule "cat→pet" and recorded, illustrated under both skip count 313d in table 300d.

Because search result 332d included both the synonym "pet" as well as the original query term, "cat," the selection of search result 334d is not counted as a crucial skip for the synonym rule "cat→pet."

Figure 3E:
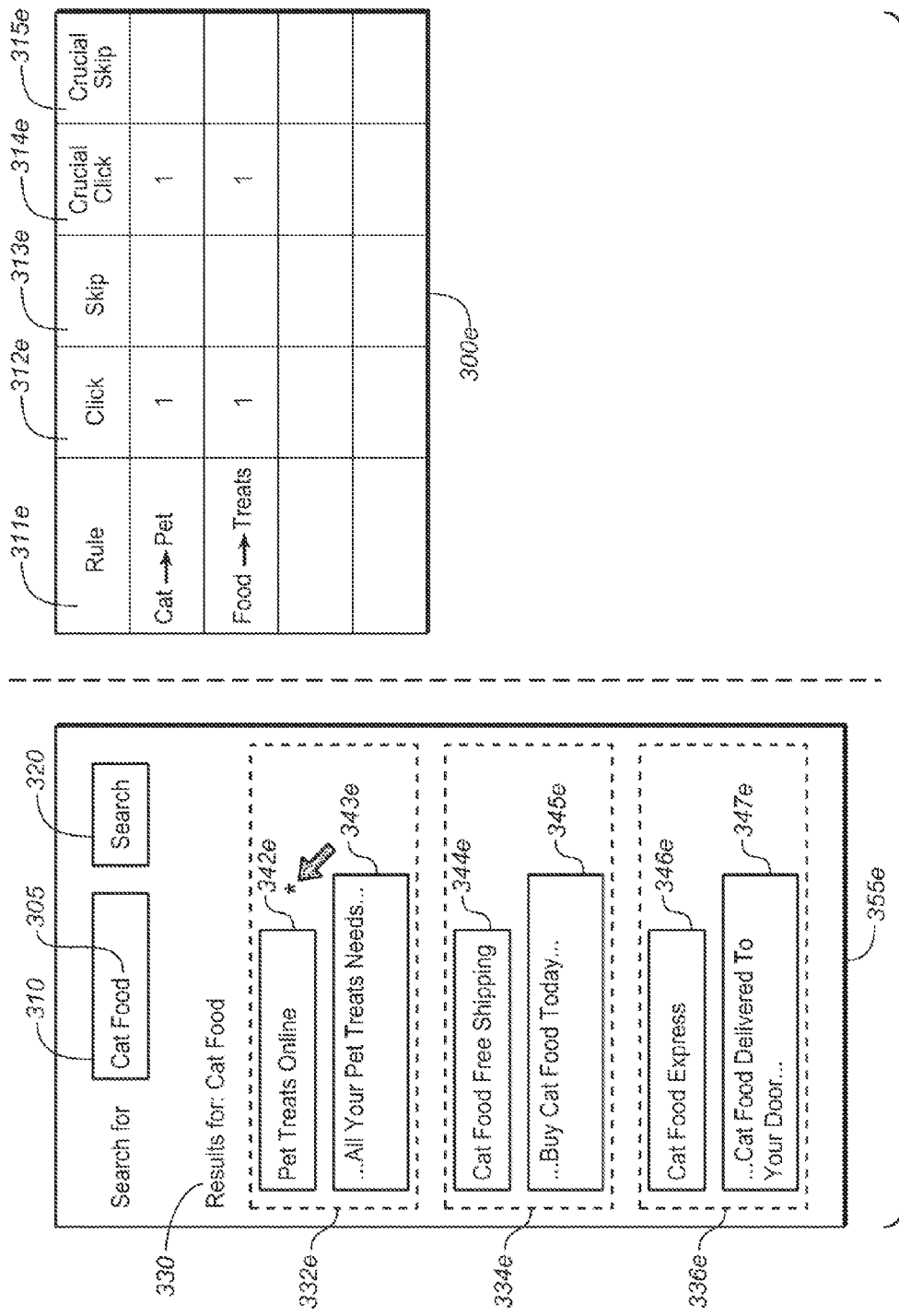

FIG. 3E illustrates an example search results page 355e and a table 300e that shows the example result of evaluating synonym rules using click and skip evaluation. In this example, two synonym rules have been used to generate a revised search query, "cat→pet" and "food→treats," e.g. revised search query "cat pet food treats." In this example, search result 332e has been selected by a user.

For the particular synonym rule "cat→pet," search result 332e includes the a synonym in the revised search query, "pet." Therefore, the selection of search result 332e is counted as a "click" for the synonym rule "cat→pet" and recorded, illustrated under click count 312e in table 300e. Additionally, for the particular synonym rule "food→treats," search result 332e includes a synonym in the revised search query "treats" (" . . . All your pet treats needs . . . "). Therefore, the selection of search result 332e is also counted as a click for the synonym rule "food→treats" and recorded, illustrated under click count 312e in table 300e.

In addition, for the particular synonym rule "cat→pet," search result 332e (i) includes a synonym in the revised search query, "pet", (ii) does not include the original query term, "cat", and (iii) does not include any other synonyms in the revised search query for the query term, "cat." The search result 332e includes a second synonym in the revised search query for a different original query term, "food", (food→treats), which can be treated independently. Therefore, the selection of search result 332e is counted as a "crucial click" for the synonym rule "cat→pet" and recorded, illustrated under crucial click count 314e in table 300e.

Additionally, for the particular synonym rule "food→treats," search result 332e (i) includes a synonym in the revised search query, "treats", (ii) does not include the original query term, "food", and (iii) does not include any other synonyms in the revised search query for the query term "food." Therefore, the selection of search result 332e is also counted as a "crucial click" for the synonym rule "food→treats" and recorded, illustrated as a crucial click 314e in table 300e.

Figure 3F:
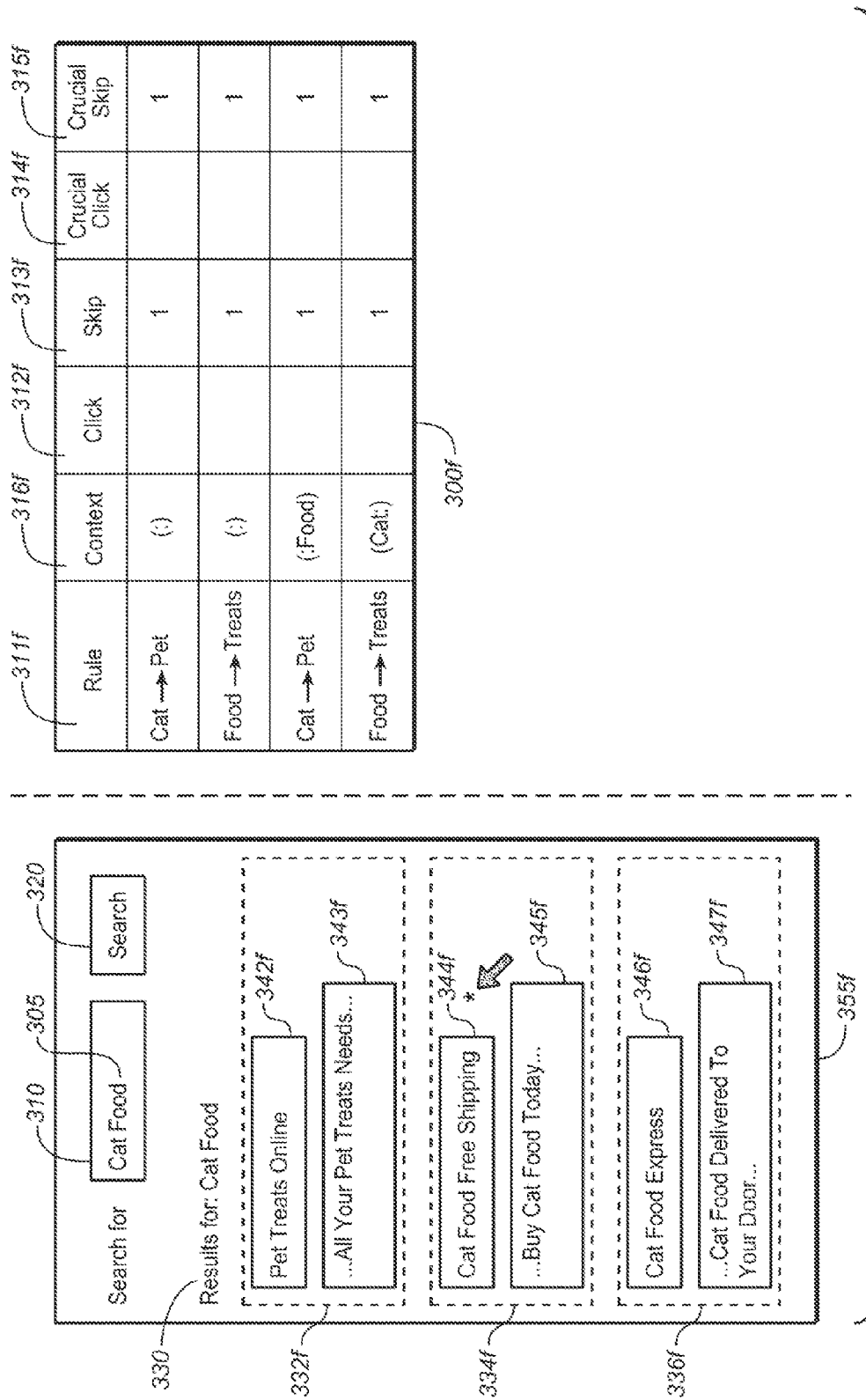

FIG. 3F illustrates an example search results page 355f and a table 300f that shows the example result of evaluating synonym rules using click and skip evaluation. In this example, two synonym rules have been used to generate a revised search query, "cat→pet" and "food→treats," e.g. revised search query "cat pet food treats." In this example, search result 334f has been selected by a user.

For the particular synonym rule "cat→pet," selected search result 334f is below a search result (search result 332f) that includes a synonym in the revised search query, "pet." Therefore, the selection of search result 334f is counted as a "skip" for the synonym rule "cat→pet" and recorded, illustrated under skip count 313f in table 300f. Additionally, for the particular synonym rule "food→treats," selected search result 334f is below a search result (search result 332f) that includes a synonym in the revised search query, "treats" (" . . . All your pet treats needs . . . "). Therefore, the selection of search result 334f is also counted as a skip for the synonym rule "food→treats" and recorded, illustrated under skip count 313f in table 300f.

In addition, for the particular synonym rule "cat→pet," selected search result 334f is below a search result (search result 332f) that (i) includes a synonym in the revised query, "pet", (ii) does not include the original query term, "cat", and (iii) does not include any other synonyms in the revised search query for the query term, "cat." Therefore, the selection of search result 334f is counted as a "crucial skip" for the synonym rule "cat→pet" and recorded, illustrated under crucial skip count 315f in table 300f.

Additionally, for the particular synonym rule "food→treats," selected search result 334f is below a search result (search result 332f) that (i) includes a synonym in the revised search query, "treats", (ii) does not include the original query term, "food", and (iii) does not include any other synonyms in the revised search query for the query term "food." Therefore, the selection of search result 334f is also counted as a "crucial skip" for the synonym rule "food→treats" and recorded, illustrated under crucial skip count 315f in table 300f.

Each synonym rule being evaluated can have a corresponding query context condition 316f, which specifies one or more words that must appear to the left or right of the original query term for the synonym rule to apply. For example, the synonym rule "cat→pet" can be separately evaluated when "cat" appears to the left of "food" in the query. The context notation illustrated under 316*f* for "food" appearing to the right of the synonym substitution is "(:food)." Similarly, the synonym rule "food→treats" can be separately evaluated when "food" appears to the right of "cat" in the query (i.e. in the context "(cat:)" as shown in table 300*f*).

Figure 3G:
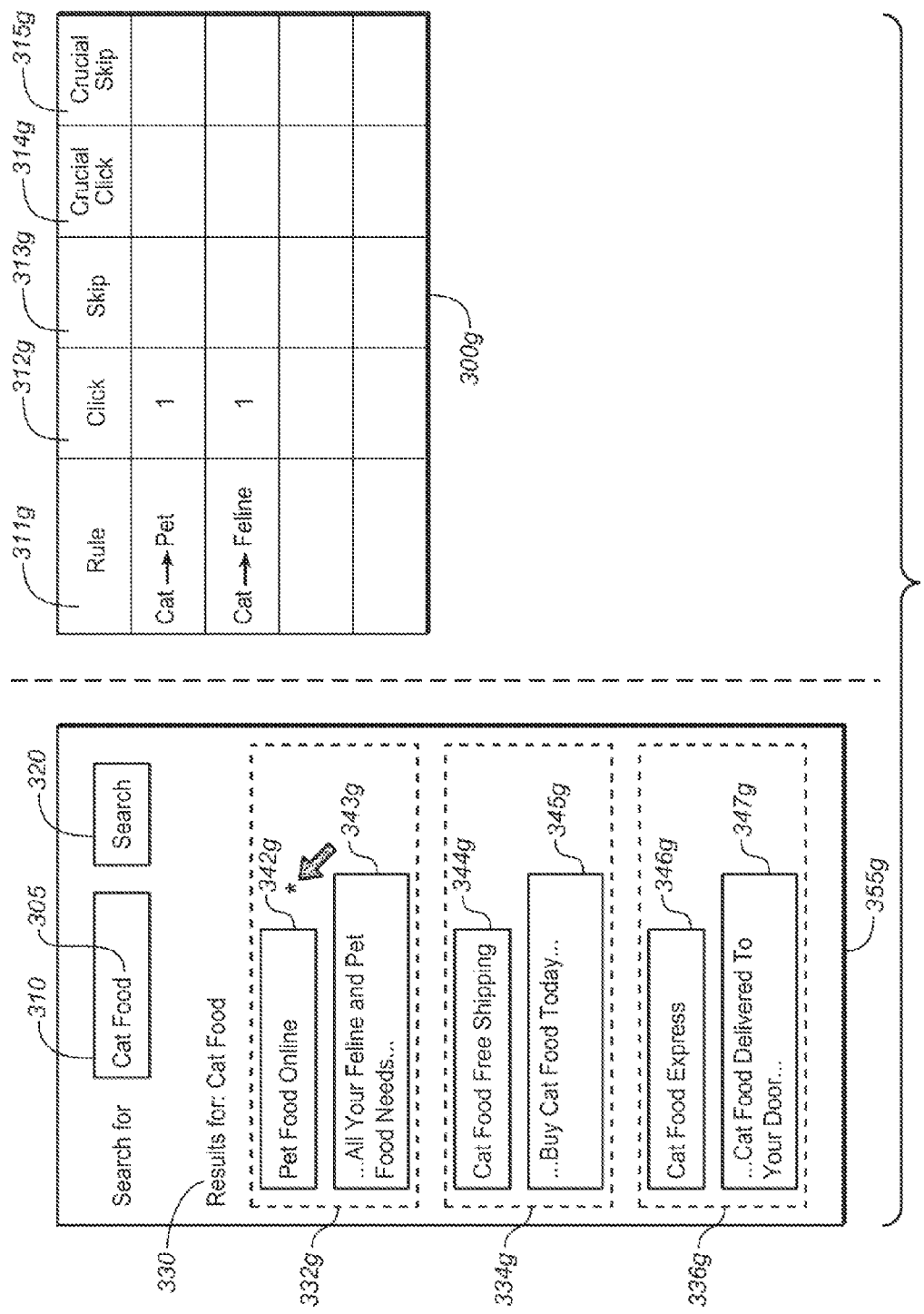

FIG. 3G illustrates an example search results page 355*g* and a table 300*g* that shows the example result of evaluating synonym rules using click and skip evaluation. In this example, two synonym rules have been used for the same query term, "cat→pet" and "cat→feline." The two synonym rules can be used to generate a revised search query, e.g. "cat feline food." In this example, search result 332*g* has been selected by a user.

For the particular synonym rule "cat→pet," search result 332*g* includes the synonym in the revised search query, "pet." Therefore, the selection of search result 332*g* is counted as a "click" for the synonym rule "cat→pet" and recorded, illustrated under click count 312*g* in table 300*g*. Additionally, for the particular synonym rule "cat→feline," search result 332*g* includes a synonym in the revised search query, "feline" (" . . . All your feline and pet food needs . . . "). Therefore, the selection of search result 332*g* is also counted as a click for the synonym rule "cat→feline" and recorded, illustrated under click 312*g* in table 300*g*.

However, for synonym rule "cat→pet," because search result 332*g* also included another synonym in the revised search query ("cat→feline"), the selection of search result 332*g* is not counted as a crucial click for the synonym rule "cat→pet." Similarly, the selection of search result 332*g* is not counted as crucial click for the synonym rule "cat→feline."

Figure 3H:
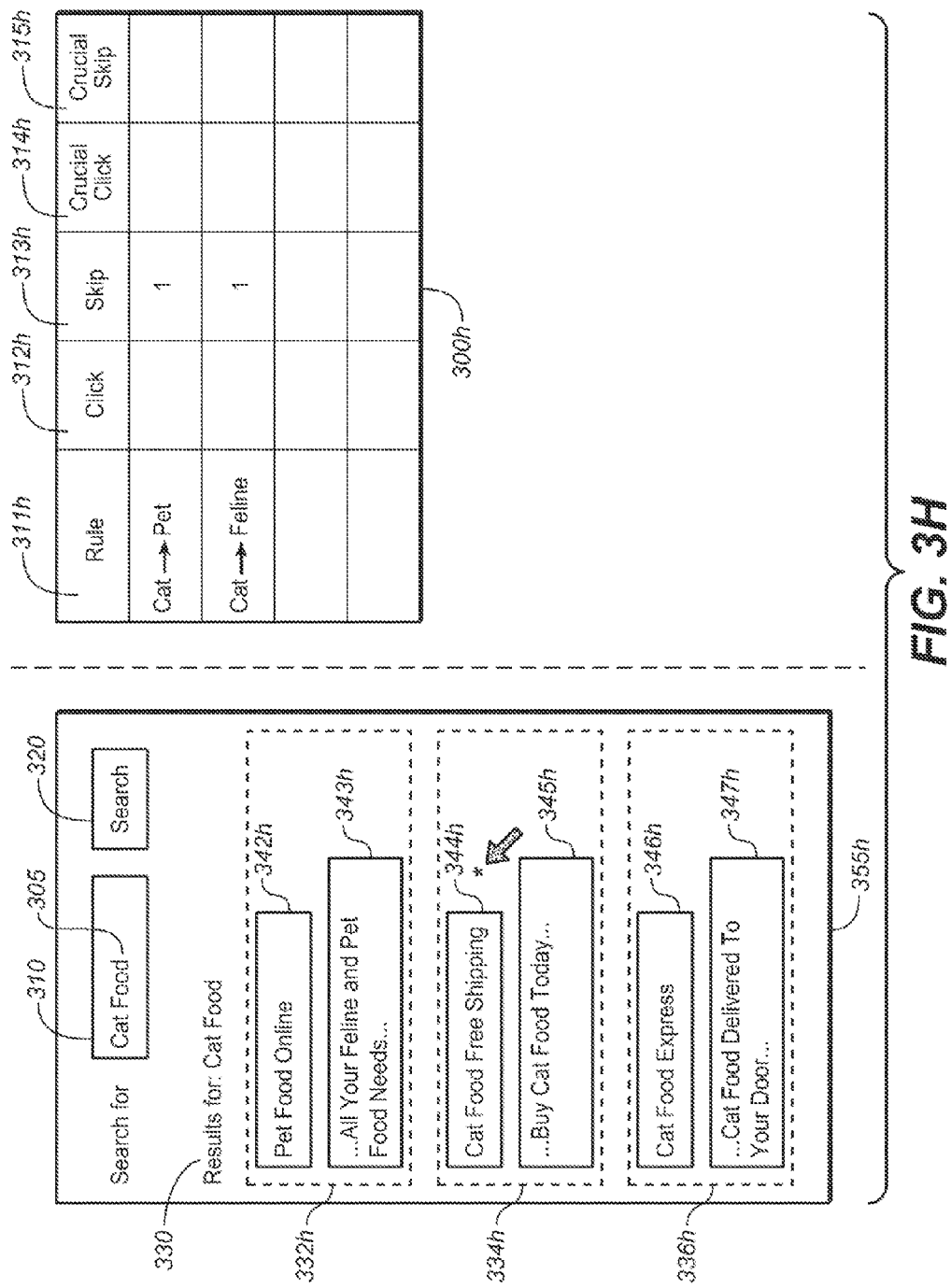

FIG. 3H illustrates an example search results page 355*h* and a table 300*h* that shows the example result of evaluating synonym rules using click and skip evaluation. The example search results page 355*h* is similar to the search results page generated in response to revised search query "cat feline food" as shown in FIG. 3G. However, in this example, search result 334*h* has been selected by the user instead of search result 332*h*.

For the particular synonym rule "cat→pet," selected search result 334*h* is below a search result (search result 332*h*) that includes a synonym in the revised search query, "pet." Therefore, the selection of search result 334*h* is counted as a "skip" for the synonym rule "cat→pet" and recorded, illustrated under skip count 313*h* in table 300*h*. Additionally, for the particular synonym rule "cat→feline," selected search result 334*h* is below a search result (search result 332*h*) that includes a synonym in the revised search query, "feline" (" . . . All your feline and pet food needs . . . "). Therefore, the selection of search result 334 is also counted as a skip for the synonym rule "cat→feline" and recorded, illustrated under skip count 313*h* in table 300.

However, for synonym rule "cat→pet," because search result 332*h* also included another synonym in the revised search query ("cat→feline"), the selection of search result 334*h* is not counted as a crucial skip for the synonym rule "cat→pet." Similarly, the selection of search result 334*h* is not counted as crucial skip for the synonym rule "cat→feline."

Figure 4:
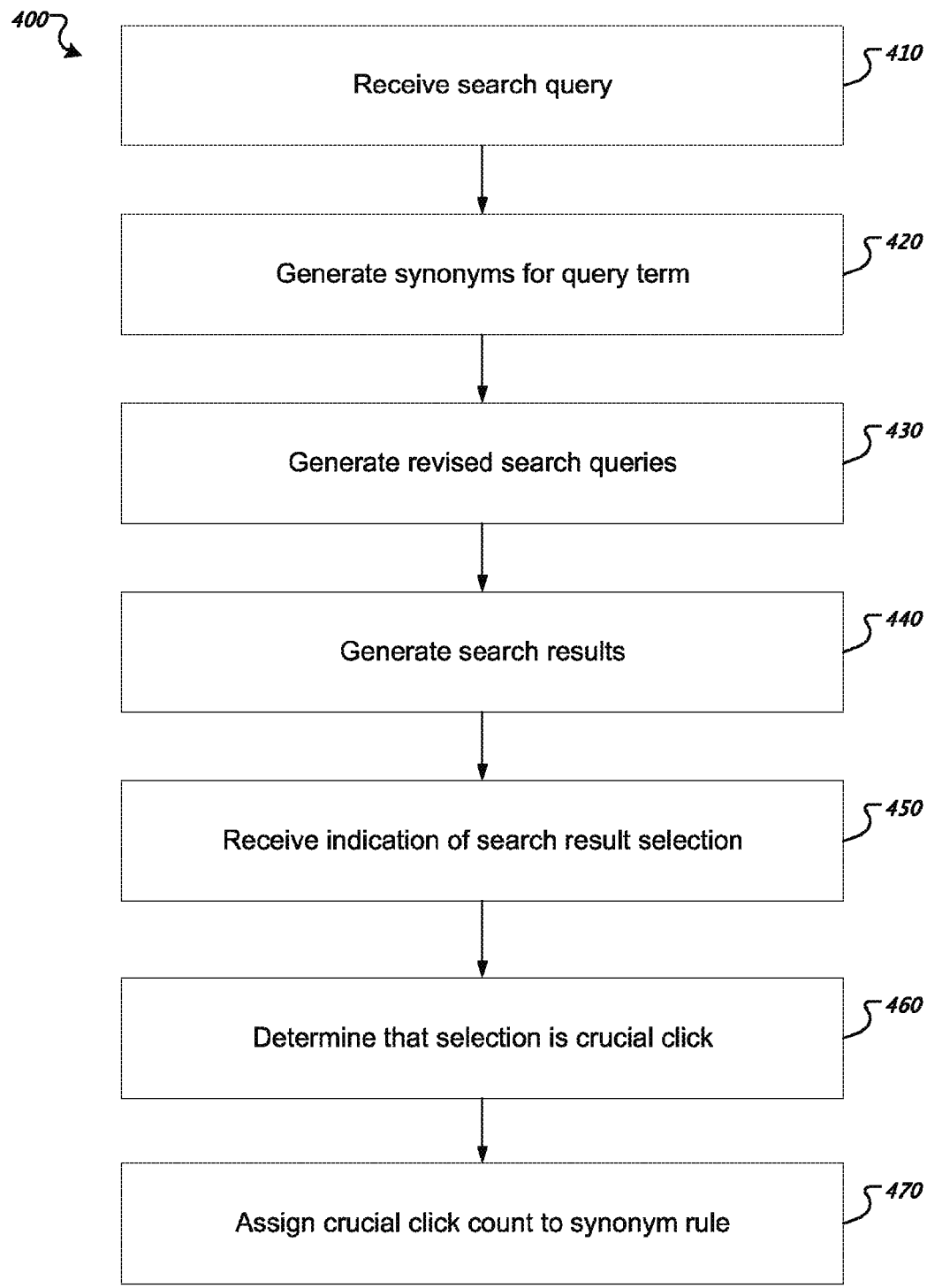
FIGS. 4, 5 and 7 are flow charts of example processes for evaluating synonym rules using click and skip evaluation.

FIG. 4 is a flow chart of an example process 400 for evaluating synonym rules using click and skip evaluation. In general, the process 400 analyzes user interaction with a provided set of search results that were identified using revised queries generated using a particular synonym rule. The process 400 will be described as being performed by a computer system comprising one or more computers, for example, the search system 130 as shown in FIG. 1.

The system receives an initial search query including a query term (410). Search queries can contain one or more terms. For each query term, the system can identify synonyms for each query term to be used for retrieving search results.

The system generates one or more synonyms for the query term using a corresponding one or more synonym rules (420). Synonym rules identify a second term that is considered to be a synonym of the query term. Synonym rules can also identify a second term that is not a synonym of the query term. As described above, a synonym rule can either be general, in which the rule applies regardless of other terms in the query, or the synonym rule can be context-specific, in which the rule only applies when other particular words are in the query. For example, the rule "cat→pet" can be modified to apply only when the query term, "cat" is followed by the query term "food."

The system generates one or more revised search queries that include the one or more synonyms for the query term (430). In some implementations, the system generates revised queries by adding synonyms for each term in the original query. In some other implementations, the system replaces one or more terms of the original query with synonyms of the one or more terms.

The system generates search results using the initial search query and the one or more revised search queries (440). By using a revised query containing synonyms, the system can retrieve search results that would otherwise not have been identified. The system can use the retrieved search results to generate a search results page that is forwarded for display by a client device.

The system receives an indication that the user has selected a particular search result (450). The system determines that the particular search result includes a particular synonym for the query term that occurs in the revised search query, and includes neither (i) the query term nor (ii) any other synonym for the query term that occurs in the revised search query (460). In some implementations, instead of analyzing only the provided search result, the system analyzes the entire indexed document for the presence or absence of synonyms and original query terms. The system can identify that the selected search result is a crucial click scenario and increment the appropriate crucial click count for the synonym rule.

In some implementations, the system can also increment a click count for the synonym rule. As described above with respect to FIG. 3E, the system can increment a crucial click count for one or more independent query revisions for a single selected search result.

The system assigns a crucial click count to a synonym rule that corresponds to the particular synonym (470). The system can combine one or multiple click and skip counts into a single score for the synonym rule. Each count can have an associated weight. For example, the system can weight the crucial click count and crucial skip count as five times more significant than the click count and skip count.

In some implementations, the system computes a score based on a ratio of crucial click counts to crucial skip counts. The system can then use the score to adjust a confidence score for the particular synonym rule. The system can also remove a synonym rule whose score did not exceed a threshold. In other words, subsequently generated revised queries will not include synonyms according to the removed synonym rule.

In some implementations, the system can compute click counts and skip counts for a particular synonym rule offline by processing data stored in a query log. Query logs store data anonymized data regarding provided search results for a certain period of time (e.g. a week). Query log data can include, for example, an initial search query, synonyms generated for terms in the initial search query, one or more revised queries used to retrieve search results, the search results retrieved by the initial search query and one or more revised search queries, and one or more search results that were selected by a user.

By using query log data, the system can compute confidence scores using click counts and skip counts offline instead of waiting for real-time interaction with provided search results. The system can process query log data periodically to compute scores for synonym rules and remove or adjust confidence scores of synonym rules as needed.

Figure 5:
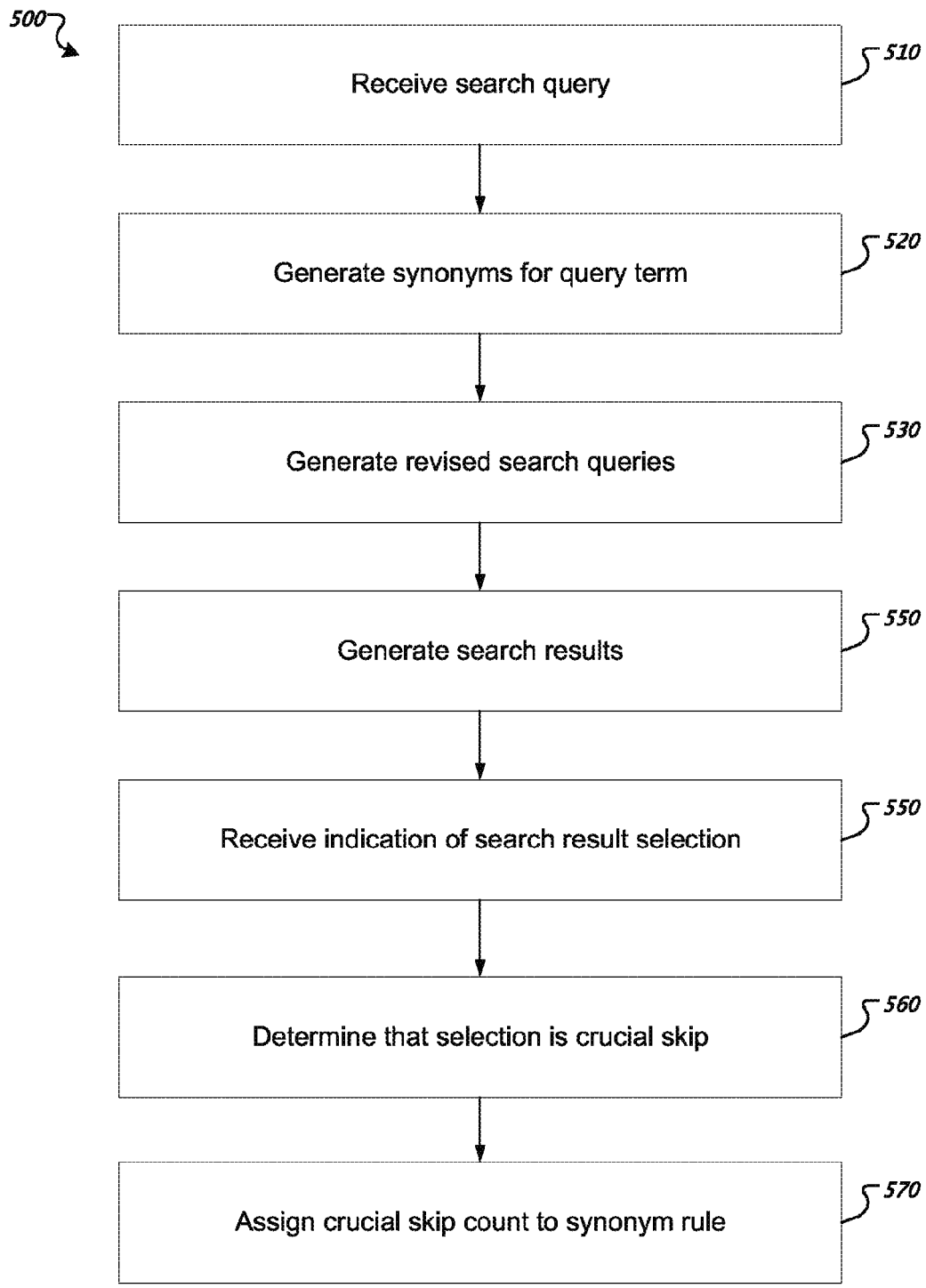

FIG. 5 is a flow chart of an example process 500 for evaluating synonym rules using clicks and skips. In general, the process 500 analyzes user interaction with a provided set of search results that were identified using revised queries generated using a particular synonym rule. The process 500 will be described as being performed by a computer system comprising one or more computers, for example, the search system 130 as shown in FIG. 1.

The system receives an initial search query including a query term (510). Search queries can contain one or more terms. For each query term, the system can identify synonyms for each query term to be used for retrieving search results.

The system generates one or more synonyms for the query term using a corresponding one or more synonym rules (520). Synonym rules identify a second term that is considered to be a synonym of the query term. Synonym rules can also identify a second term that is not a synonym of the query term. As described above, a synonym rule can either be general, in which the rule applies regardless of other terms in the query, or the synonym rule can be context-specific, in which the rule only applies when other particular words are in the query. For example, the rule "cat→pet" can be modified to apply only when the query term, "cat" is followed by the query term "food."

The system generates one or more revised search queries that include the one or more synonyms for the query term (530). In some implementations, the system generates revised queries by adding synonyms for each term in the original query. In some other implementations, the system replaces one or more terms of the original query with synonyms of the one or more terms.

The system generates search results using the initial search query and the one or more revised search queries (540). By using a revised query containing synonyms, the system can retrieve search results that would otherwise not have been identified. The system can use the retrieved search results to generate a search results page that is forwarded for display by a client device.

The system receives an indication that the user has selected a particular search result (550). The system determines that a search result that is ranked above the particular search result includes a particular synonym for the query term that occurs in the revised search query, and includes neither (i) the query term nor (ii) any other synonym for the query term that occurs in the revised search query (560). In some implementations, instead of analyzing only the provided search result, the system analyzes the entire indexed document for the presence or absence of synonyms and original query terms.

The system can identify that the selected search result is a crucial skip scenario and increment the appropriate crucial skip count for the synonym rule. In some implementations, the system can also increment a skip count for the synonym rule. As described above with respect to FIG. 3F, the system can increment a crucial skip count for one or more independent query revisions for a single selected search result.

The system assigns a crucial skip count to the synonym rule that corresponds to the particular synonym (570). The system can combine one or multiple click and skip counts into a single score for the synonym rule. Each count can have an associated weight. For example, the system can weight the crucial click count and crucial skip count as five times more significant than the click count and skip count.

In some implementations, the system computes a score based on a ratio of crucial click counts to crucial skip counts. The system can then use the score to adjust a confidence score for the particular synonym rule. The system can also remove a synonym rule whose score did not exceed a threshold. In other words, subsequently generated revised queries will not include synonyms according to the removed synonym rule.

Other types of skips, including fake skips, are informative for use in evaluating synonym rules. In general, a fake skip occurs when a user selects a search result that includes, or whose corresponding document includes, a system selected synonym of a query term and the original query term, that was ranked below a search result that includes, or whose corresponding document includes, the same synonym of the query term. In some implementations, both the clicked search result and the skipped search result contain the original query term.

In some implementations, a fake skip occurs when the text of the search results themselves includes the synonym. In other implementations, a fake skip occurs when the text of the documents referenced by the search results includes the synonym, but the text of one or more of the search results does not include the synonym. Counting fake skips differently than other types of skips reflects the insight that the inclusion of the synonym in the search result may not have driven the user to skip a particular search result, because the selected search result also included the same synonym.

Figure 6A:
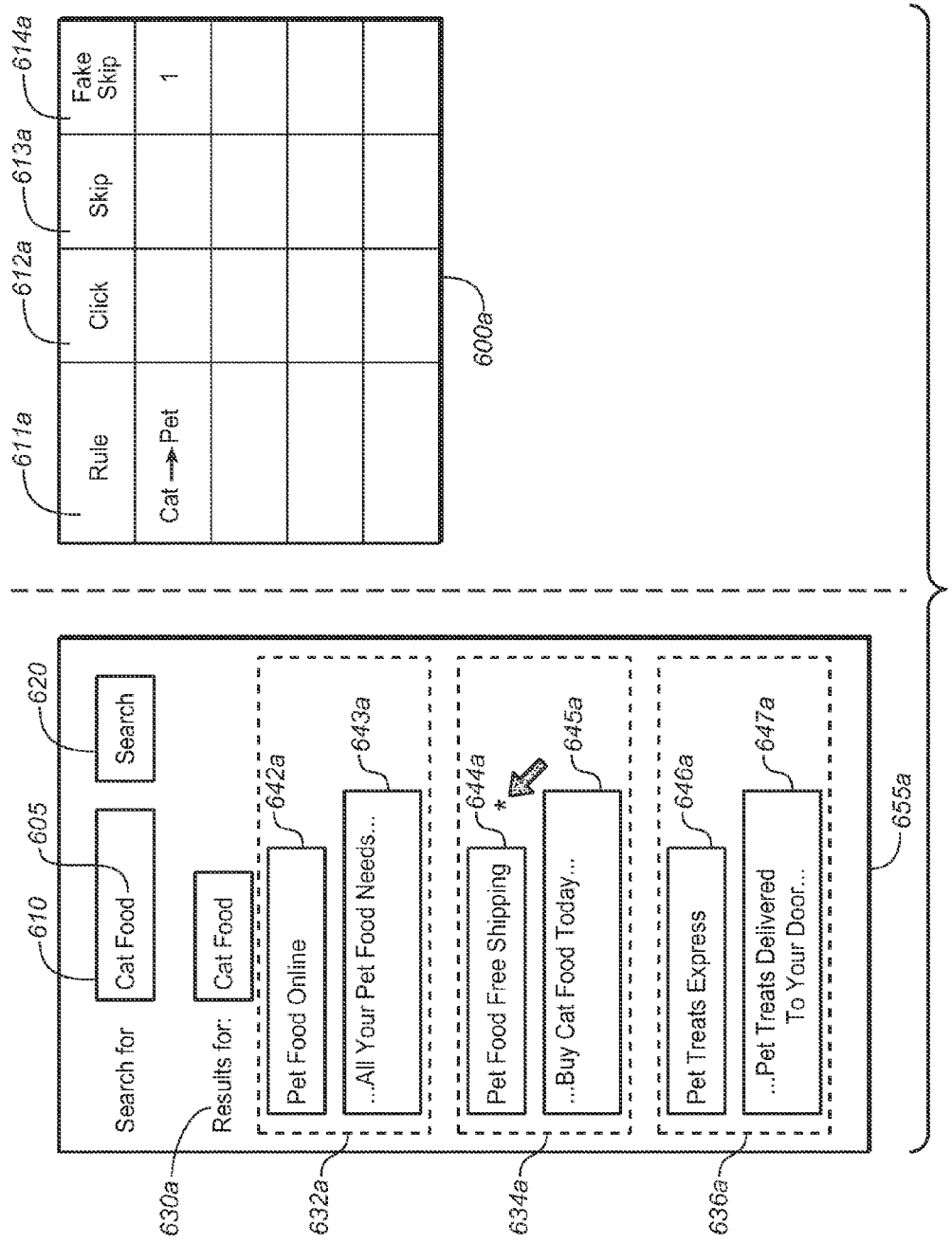

FIG. 6A illustrates an example search results page 655a and a table 600a that show the example result of evaluating synonym rules using click or skip evaluation. The search results page 655a presents a ranked list of search results in response to a query 605 ("cat food") entered into a search box 610. The search results page can include a control element 620 (e.g. a button) for initiating a search. Each search result 632a, 634a, and 636a includes a title (e.g. "Pet Food Online" 342a) and a snippet (e.g. " . . . All your pet food needs . . . " 343a).

A user's selection of a particular search result can be subjected to click or skip evaluation, resulting in a click or a skip being counted for particular synonym rules associated with the particular search result. The search results page 655a can be provided by a search system, for example, search system 130 as shown in FIG. 1. In addition, a search system (for example, search system 130) can receive user selections of search results on the search results page 655a and evaluate synonym rules based on the user selections.

In the example illustrated, for the two-term query "cat food," the synonym rule "cat→pet" was used to generate a three-term revised query (not shown) including the terms "cat pet food." The table 600a shows the synonym rules 611a that have been used to generate revised queries (not shown) used to retrieve search results 632a, 634a, and 636a. The resulting click count 612a, skip count 613a, and fake skip count 614a are also illustrated in table 600a. In the example shown in FIG. 6A, only the synonym rule "cat→pet" is illustrated, although synonym rules other than those shown in the table 600a may also have been used to retrieve search results 632a, 634a, and 636a.

In this example, the search result 634a has been selected by a user. For the particular synonym rule "cat→pet," both search result 632a and 634a include the synonym "pet," and the search result 634a includes the original query term "cat." The search result 632a is ranked above the search result 634a because it is listed above the search result 634a in the search results page 655a. The user clicks on the search result 634b and thus skips the search result 634b. Therefore, the skip of the search result 632a is counted as a fake skip for the synonym rule "cat→pet" and recorded, illustrated under fake skip count 614a in table 600a.

Figure 6B:
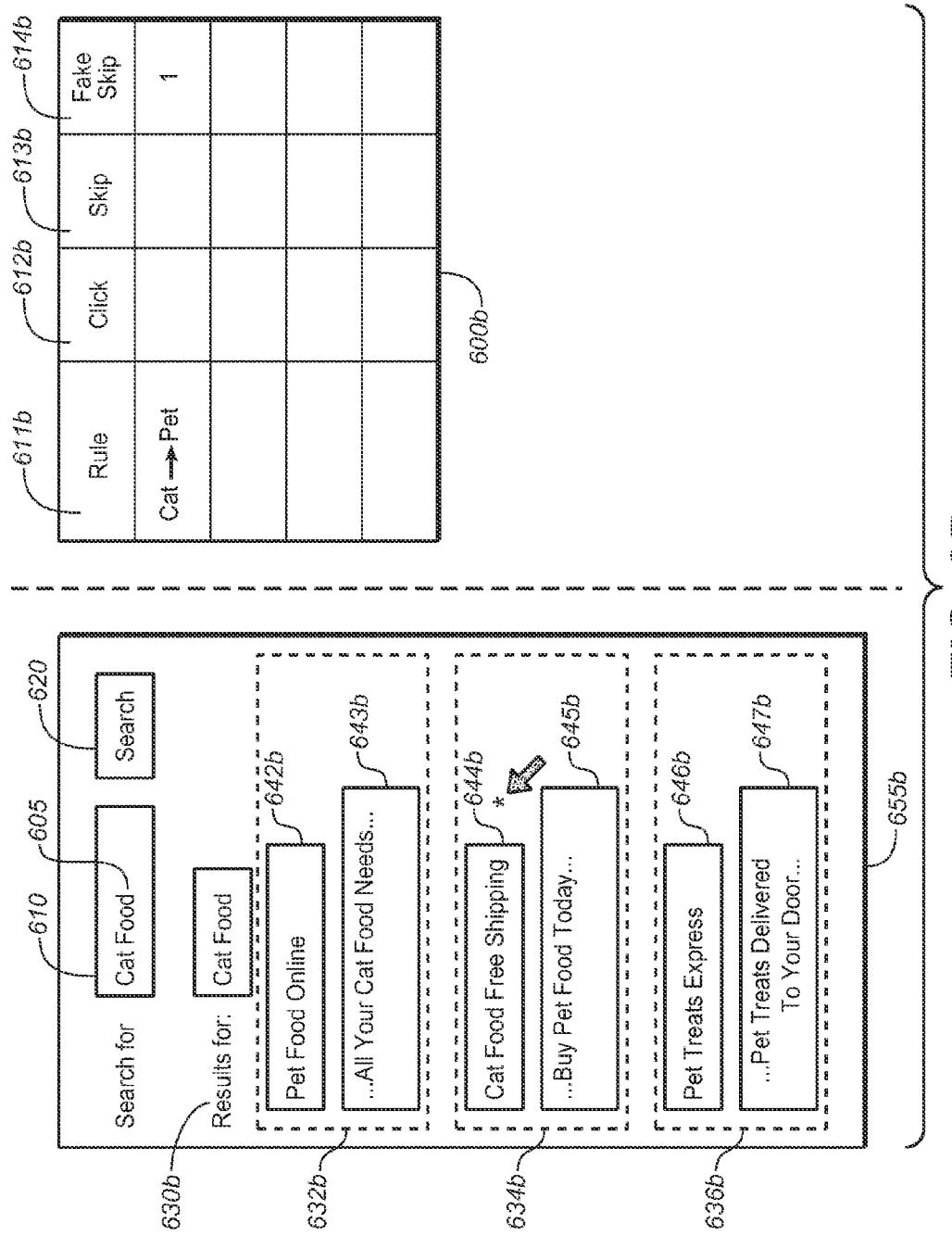

FIG. 6B illustrates an example search results page 655b and a table 600b that shows the example result of evaluating synonym rules using click and skip evaluation. The example search results page 655b is similar to the search results page as shown in FIG. 6A. However, in this example, the first search result (search result 632b) contains the original search term in addition to the synonym.

For the particular synonym rule "cat→pet," the selected search result 634b and the skipped search result 632b both include the synonym "pet" and the original search term "cat." The search result 632b is ranked above the search result 634b because it is listed above the search result 634b on the search results page 655b. The user clicks on the search result 634b and thus skips the search result 632b. Therefore, the selection of the search result 634b below search result 632b is counted as a fake skip for the synonym rule "cat→pet" and recorded, illustrated under skip count 613b in table 600b.

Referring back to FIG. 2, the synonym system 280 can aggregate counts of clicks, skips, and fake skips into a single score to evaluate a particular synonym rule. In some implementations, the synonym system 280 can remove a synonym rule whose corresponding score is below a threshold.

For example, the synonym system 280 can assign a respective weight (e.g. 3, 5, 10) to a click count, a skip count, and a fake skip count. In some implementations, the weights are empirically determined. The synonym system 280 can then compute a weighted ratio using a combination of counts recorded for a particular synonym rule as shown below in Equation (3), using example weights 3, 5, and 10:

$$\frac{10(\text{fake skip count}) + 5(\text{skip count})}{10(\text{fake skip count}) + 5(\text{skip count}) + 3(\text{click count})} \quad (3)$$

If the score is below a threshold (e.g. 0.6, 0.75, 0.9, 0.99), the synonym system 280 can remove or demote a particular synonym rule. After removing the synonym rule from the system, revised queries generated by the search engine system 230 will not include synonyms identified with the particular synonym rule.

Figure 7:
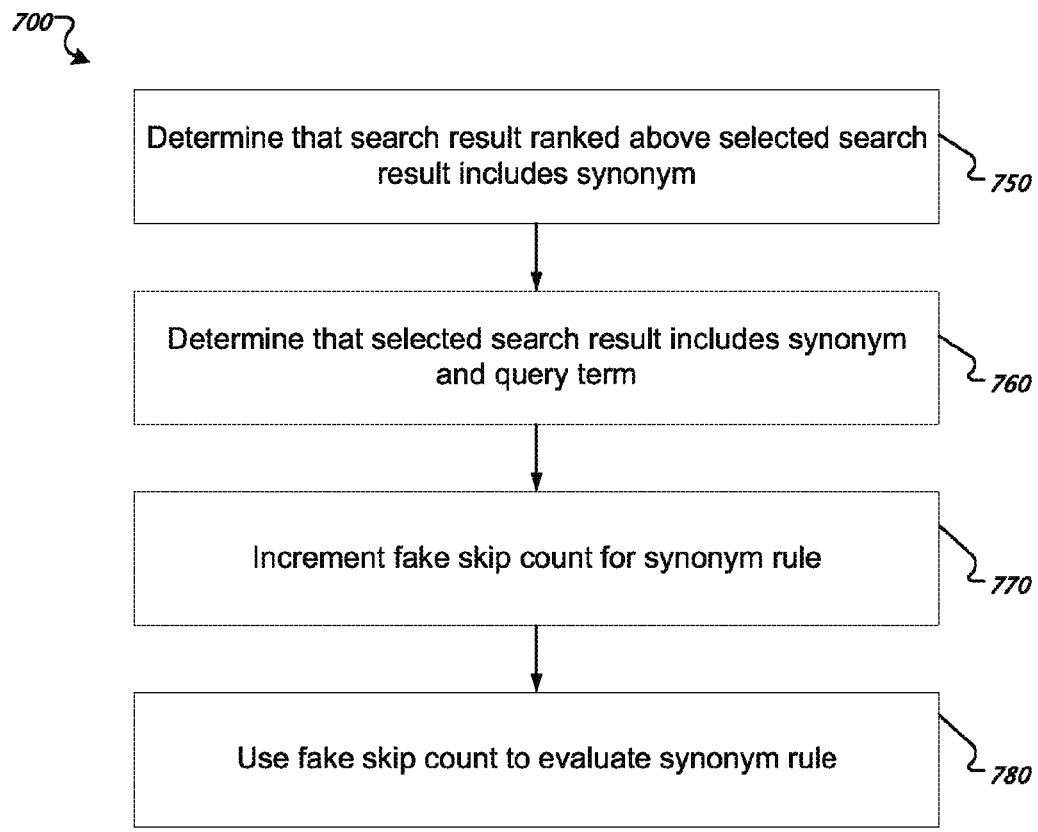

FIG. 7 is a flow chart of an example process 700 for evaluating synonym rules using clicks and skips. In general, the process 700 analyzes user interaction with a provided set of search results that were identified using revised queries generated using a particular synonym rule. The process 700 will be described as being performed by a computer system which includes one or more computers, for example, the search system 130 as shown in FIG. 1.

The system receives an initial search query including a query term. Search queries can contain one or more terms. For each query term, the system can obtain synonyms for each query term to be used for retrieving search results.

The system generates one or more synonyms for the query term using a corresponding one or more synonym rules. Synonym rules obtain a second term that is considered to be a synonym of the query term. Synonym rules can also obtain a second term that is not a synonym of the query term. As described above, a synonym rule can either be general, in which the rule applies regardless of other terms in the query, or the synonym rule can be context-specific, in which the rule only applies when other particular words are in the query. For example, the rule "cat→pet" can be modified to apply only when the query term "cat" is followed by the query term "food."

The system generates one or more revised search queries that include the one or more synonyms for the query term. In some implementations, the system generates revised queries by adding synonyms for each term in the original query. In some other implementations, the system replaces one or more terms of the original query with synonyms of the one or more terms.

The system generates search results using the initial search query and the one or more revised search queries. By using a revised query containing synonyms, the system can retrieve search results that would otherwise not have been identified. The system can use the retrieved search results to generate a search results page that is forwarded for display by a client device.

The system can either operate offline or in real time. If the system operates offline, then the system can access and process stored query log data independent of users inputting search queries. If the system operates in real time, then the system can access and process stored query log data in response to the user's inputted search query and return revised search queries to the user.

The system receives an indication that the user has selected a particular search result. The system determines that a search result, that is ranked above the particular search result, includes a particular synonym for the query term (750). The system also determines that the selected search result includes both the same particular synonym for the query term and the original query term (760). In some implementations, instead of analyzing only the provided search result, the system analyzes the entire indexed document for the presence or absence of synonyms and original query terms. The system can identify that the selected search result is a fake skip scenario and increment the appropriate fake skip count for the synonym rule.

The system assigns a fake skip count to the synonym rule that corresponds to the particular synonym (770). The system can combine one or multiple click and skip counts into a single score for the synonym rule. Each count can have an associated weight. For example, the system can weight the click count and skip count as five times more significant than the fake skip count.

In some implementations, the system computes a score based on a ratio involving click counts, skip counts, and fake skip counts. The system can then use the score to adjust a confidence score for the particular synonym rule (780). The system can also remove a synonym rule whose score did not exceed a threshold. In other words, subsequently generated revised queries will not include synonyms according to the removed synonym rule.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining, using data associated with search queries submitted by past users of a search engine, that a particular search result selected by a particular, past user of the search engine includes a query term included in an initial search query, and a particular synonym that was generated for the query term included in the initial search query using a particular synonym rule, wherein the data associated with the search queries indicates that the particular search result was selected by the particular, past user of the search engine from among multiple search results that were generated by the search engine using the initial search query and one or more revised search queries that include the particular synonym for the query term;
   determining, using the data associated with the search queries, that a different search result that also includes the particular synonym for the query term was ranked above the particular search result and was not selected by the particular, past user of the search engine;
   in response to determining that (i) the particular search result selected by the particular, past user of the search engine includes the query term included in the initial search query, and the particular synonym for the query term, and (ii) the different search result that also includes the particular synonym for the query term was ranked above the particular search result and was not selected by the particular, past user of the search engine, incrementing a particular type of skip count for the particular synonym rule; and
   determining whether to revise a subsequently received search query that includes the query term included in the initial search query, to include the particular synonym for the query term, based at least on the particular type of skip count for the particular synonym rule.

2. The method of claim 1, comprising assigning a score to the particular synonym rule based at least in part on the particular type of skip count for the particular synonym rule.

3. The method of claim 2, wherein assigning the score to the particular synonym rule based at least in part on the particular type of skip count for the particular synonym rule comprises assigning the score to the particular synonym rule based on the particular type of skip count for the particular synonym rule, a click count for the particular synonym rule, and a different type of skip count for the particular synonym rule.

4. The method of claim 3, comprising associating a first weight with the particular type of skip count for the particular synonym rule, a second weight with the different type of skip count for the particular synonym rule, and a third weight with the click count for the particular synonym rule.

5. The method of claim 2, further comprising:
   determining that the score assigned to the particular synonym rule does not meet a threshold; and
   removing the particular synonym rule from a set of synonym rules used to generate revised search queries based on determining that the score assigned to the particular synonym rule does not meet the threshold.

6. The method of claim 1, wherein the different search result includes the query term included in the initial search query.

7. The method of claim 1, comprising determining, using the data associated with the search queries, that the particular synonym for the query term was generated for the query term using a synonym rule associated with a particular query context, and wherein incrementing the particular type of skip count for the particular synonym rule comprises incrementing the particular type of skip count for the synonym rule associated with the particular query context.

8. The method of claim 3, wherein the score assigned to the particular synonym rule satisfies:

$$\frac{W1(\text{particular type of skip count}) + W2(\text{different type of skip count})}{W1(\text{particular type of skip count}) + W2(\text{different type of skip count}) + W3(\text{click count})},$$

wherein W1 represents a weight associated with the particular type of skip count for the particular synonym rule, W2 represents a weight associated with the different type of skip count for the particular synonym rule, and W3 represents a weight associated with the click count for the particular synonym rule.

9. A computer-readable storage device having stored thereon instructions, which, when executed by a computer, cause the computer to perform operations comprising:

determining, using data associated with search queries submitted by past users of a search engine, that a particular search result selected by a particular, past user of the search engine includes a query term included in an initial search query, and a particular synonym that was generated for the query term included in the initial search query using a particular synonym rule, wherein the data associated with the search queries indicates that the particular search result was selected by the particular, past user of the search engine from among multiple search results that were generated by the search engine using the initial search query and one or more revised search queries that include the particular synonym for the query term;

determining, using the data associated with the search queries, that a different search result that also includes the particular synonym for the query term was ranked above the particular search result and was not selected by the particular, past user of the search engine;

in response to determining that (i) the particular search result selected by the particular, past user of the search engine includes the query term included in the initial search query, and the particular synonym for the query term, and (ii) the different search result that also includes the particular synonym for the query term was ranked above the particular search result and was not selected by the particular, past user of the search engine, incrementing a particular type of skip count for the particular synonym rule; and determining whether to revise a subsequently received search query that includes the query term included in the initial search query, to include the particular synonym for the query term, based at least on the particular type of skip count for the particular synonym rule.

10. The device of claim 9, wherein the operations comprise assigning a score to the particular synonym rule based at least in part on the particular type of skip count for the particular synonym rule.

11. The device of claim 10, wherein assigning the score to the particular synonym rule based at least in part on the particular type of skip count for the particular synonym rule comprises assigning the score to the particular synonym rule based on the particular type of skip count for the particular synonym rule, a click count for the particular synonym rule, and a different type of skip count for the particular synonym rule.

12. The device of claim 11, wherein the operations comprise associating a first weight with the particular type of skip count for the particular synonym rule, a second weight with the different type of skip count for the particular synonym rule, and a third weight with the click count for the particular synonym rule.

13. The device of claim 10, wherein the operations comprise:

determining that the score assigned to the particular synonym rule does not meet a threshold; and removing the particular synonym rule from a set of synonym rules used to generate revised search queries based on determining that the score assigned to the particular synonym rule does not meet the threshold.

14. The device of claim 9, wherein the different search result includes the query term included in the initial search query.

15. The device of claim 9, wherein the operations comprise determining, using the data associated with the search queries, that the particular synonym for the query term was generated for the query term using a synonym rule associated with a particular query context, and wherein incrementing the particular type of skip count for the particular synonym rule comprises incrementing the particular type of skip count for the synonym rule associated with the particular query context.

16. The device of claim 11, wherein the score assigned to the particular synonym rule satisfies:

$$\frac{W1(\text{particular type of skip count}) + W2(\text{different type of skip count})}{W1(\text{particular type of skip count}) + W2(\text{different type of skip count}) + W3(\text{click count})},$$

wherein W1 represents a weight associated with the particular type of skip count for the particular synonym rule, W2 represents a weight associated with the different type of skip count for the particular synonym rule, and W3 represents a weight associated with the click count for the particular synonym rule.

17. A system comprising:

one or more computers; and a computer readable storage device having stored thereon instructions that, when executed by the one or more computers, cause the one or more computers to perform operations comprising:

determining, using data associated with search queries submitted by past users of a search engine, that a particular search result selected by a particular, past user of the search engine includes a query term included in an initial search query, and a particular synonym that was generated for the query term included in the initial search query using a particular synonym rule, wherein the data associated with the search queries indicates that the particular search result was selected by the particular, past user of the search engine from among multiple search results that were generated by the search engine using the initial search query and one or more revised search queries that include the particular synonym for the query term;

determining, using the data associated with the search queries, that a different search result that also includes the particular synonym for the query term was ranked above the particular search result and was not selected by the particular, past user of the search engine;

in response to determining that (i) the particular search result selected by the particular, past user of the search engine includes the query term included in the initial search query, and the particular synonym for the query term, and (ii) the different search result that also includes the particular synonym for the query term was ranked above the particular search result and was not selected by the particular, past user of the search engine incrementing a particular type of skip count for the particular synonym rule; and determining whether to revise a subsequently received search query that includes the query term included in the initial search query, to include the particular synonym for the query term, based at least on the particular type of skip count for the particular synonym rule.

18. The system of claim 17, wherein the operations comprise assigning a score to the particular synonym rule based at least in part on the particular type of skip count for the particular synonym rule.

19. The system of claim 18, wherein assigning the score to the particular synonym rule based at least in part on the particular type of skip count for the particular synonym rule comprises assigning the score to the particular synonym rule based on the particular type of skip count for the particular synonym rule, a click count for the particular synonym rule, and a different type of skip count for the particular synonym rule.

20. The system of claim 19, wherein the operations comprise associating a first weight with the particular type of skip count for the particular synonym rule, a second weight with the different type of skip count for the particular synonym rule, and a third weight with the click count for the particular synonym rule.

21. The system of claim 18, wherein the operations comprise:
   determining that the score assigned to the particular synonym rule does not meet a threshold; and
   removing the particular synonym rule from a set of synonym rules used to generate revised search queries based on determining that the score assigned to the particular synonym rule does not meet the threshold.

22. The system of claim 17, wherein the different search result includes the query term included in the initial search query.

23. The system of claim 17, wherein the operations comprise determining, using the data associated with the search queries, that the particular synonym for the query term was generated for the query term using a synonym rule associated with a particular query context, and wherein incrementing the particular type of skip count for the particular synonym rule comprises incrementing the particular type of skip count for the synonym rule associated with the particular query context.

24. The system of claim 19, wherein the score assigned to the particular synonym rule satisfies:

$$\frac{W1(\text{particular type of skip count}) + W2(\text{different type of skip count})}{W1(\text{particular type of skip count}) + W2(\text{different type of skip count}) + W3(\text{click count})},$$

wherein W1 represents a weight associated with the particular type of skip count for the particular synonym rule, W2 represents a weight associated with the different type of skip count for the particular synonym rule, and W3 represents a weight associated with the click count for the particular synonym rule.

* * * * *